US012347918B2

(12) United States Patent
Zimmerman et al.

(10) Patent No.: US 12,347,918 B2
(45) **Date of Patent: *Jul. 1, 2025**

(54) ANTENNA POSITIONER WITH ECCENTRIC TILT POSITION MECHANISM

(71) Applicant: Viasat, Inc., Carlsbad, CA (US)

(72) Inventors: Kurt A. Zimmerman, Dunwoody, GA (US); Thaddeus D. Oxford, Decatur, GA (US); Scott D. Leach, Gainsville, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,438

(22) Filed: Nov. 1, 2022

(65) Prior Publication Data

US 2023/0050129 A1 Feb. 16, 2023

Related U.S. Application Data

(63) Continuation of application No. 16/960,314, filed as application No. PCT/US2019/021170 on Mar. 7, 2019, now Pat. No. 11,522,266.

(Continued)

(51) Int. Cl.
*H01Q 1/12* (2006.01)
*H01Q 3/08* (2006.01)

(52) U.S. Cl.
CPC ............. *H01Q 1/1257* (2013.01); *H01Q 3/08* (2013.01)

(58) Field of Classification Search
CPC ........ H01Q 1/125; H01Q 1/1264; H01Q 3/02; H01Q 3/04; H01Q 3/06; H01Q 3/08
See application file for complete search history.

(56) References Cited

U.S. PATENT DOCUMENTS 2,740,962 A * 4/1956 Hammond, Jr. ...... G01S 13/422 342/75
3,059,889 A * 10/1962 Pottmeyer ................ H01Q 3/08 342/359

(Continued)

FOREIGN PATENT DOCUMENTS

CN 103972652 A 8/2014
CN 104218301 A 12/2014

(Continued)

OTHER PUBLICATIONS

Columbus Mckinnon; Screw Jacks 101; https://www.cmco.com/en-us/products/power-and-motion-technology/actuators/mechanical-actuators/screw-jacks/ (Year: 2024).*

*Primary Examiner* — Ab Salam Alkassim, Jr.
(74) *Attorney, Agent, or Firm* — Holland & Hart LLP

(57) ABSTRACT

Methods, systems, and devices are described for antenna positioning with an eccentric tilt pointing mechanism. For example, a system in accordance with the present disclosure may include a base structure and an intermediate structure that is rotatably coupled with the base structure about a first axis (e.g., a tilt axis). The system may also include a positioning system that is coupled with the intermediate structure and configured to orient an antenna boresight about at least two angular degrees of freedom with respect to the intermediate structure (e.g., in an elevation-over-azimuth configuration). The system may also include an actuator between the base structure and the intermediate structure that is configured to set, change, or maintain an angle between the base structure and the intermediate structure, which, in some examples, may include a rotation of an eccentric element based on a predicted path of a target device.

20 Claims, 13 Drawing Sheets

Related U.S. Application Data

(60) Provisional application No. 62/640,386, filed on Mar. 8, 2018.

(56) References Cited

U.S. PATENT DOCUMENTS 4,652,887 A * 3/1987 Cresswell ................ H01Q 3/06 343/766
5,077,561 A * 12/1991 Gorton ...................... G01S 3/42 342/359
5,351,060 A * 9/1994 Bayne ...................... H01Q 3/20 342/359
6,034,634 A * 3/2000 Karlsson .................. H01Q 3/08 342/359
6,034,643 A * 3/2000 Nishikawa ............... H01Q 3/08 343/765
6,259,415 B1 * 7/2001 Kumpfbeck ............. H01Q 3/26 343/765
6,285,338 B1 * 9/2001 Bai ........................ H01Q 19/13 343/882
6,433,736 B1 * 8/2002 Timothy .................. H01Q 3/08 342/359
6,531,990 B2 3/2003 Verkerk
6,861,994 B2 3/2005 Desargant et al.
7,737,900 B1 6/2010 Saindon
7,764,243 B2 7/2010 Gierow et al.
8,120,541 B2 2/2012 Jung et al.
8,681,065 B2 3/2014 Voin et al.
9,263,797 B1 * 2/2016 Hall ......................... H01Q 3/02
10,553,929 B2 2/2020 Patel et al.
10,601,103 B2 3/2020 Hataya et al.
11,063,337 B2 * 7/2021 Oxford .................... H01Q 3/08
11,101,553 B2 * 8/2021 Adada .................... H01Q 25/00
11,205,841 B2 * 12/2021 Liu .......................... H01Q 3/08
11,522,266 B2 * 12/2022 Zimmerman ........ H01Q 1/1257
2001/0028327 A1 10/2001 Yamamoto et al.
2005/0146473 A1 7/2005 Stoyanov et al.
2006/0114164 A1 6/2006 Iluz et al.
2007/0052605 A1 * 3/2007 Young .................. H01Q 1/1207 343/757
2007/0097004 A1 5/2007 Sohfuku
2007/0152124 A1 * 7/2007 Staney ............... F16M 11/2014 248/371
2007/0241244 A1 * 10/2007 Tavassoli Hozouri ...................... F16M 11/18 248/183.1
2008/0042921 A1 * 2/2008 Gierow .................. H01Q 1/088 343/882
2008/0186242 A1 8/2008 Shuster et al.
2008/0278404 A1 * 11/2008 Blalock .................. H01Q 1/125 343/882
2008/0297427 A1 * 12/2008 Jung ...................... H01Q 1/288 342/357.68
2009/0038607 A1 * 2/2009 Staney .................. F24S 30/452 126/607
2009/0135074 A1 * 5/2009 Yang ....................... F16H 1/227 343/766
2009/0231224 A1 9/2009 Felstead et al.
2009/0262033 A1 * 10/2009 King ........................ H01Q 3/08 343/882
2010/0149059 A1 * 6/2010 Patel ........................ H01Q 3/08 343/765
2010/0201589 A1 8/2010 Hellberg
2011/0043433 A1 * 2/2011 Klien ....................... H01Q 3/08 359/872
2011/0068989 A1 3/2011 Bousquet
2012/0274520 A1 11/2012 Conti et al.
2013/0021214 A1 * 1/2013 Zimmerman ............ H01Q 3/08 359/873
2015/0015372 A1 * 1/2015 Hara ........................ H01Q 3/04 340/10.1
2015/0059500 A1 3/2015 Conrad et al.
2016/0365630 A1 * 12/2016 Rao ...................... H01Q 19/193
2017/0025752 A1 * 1/2017 Zimmerman ............ H01Q 3/08
2017/0077585 A1 * 3/2017 Oxford .................... H01Q 3/06
2017/0117606 A1 * 4/2017 Larson .................... F16F 15/00
2018/0301784 A1 * 10/2018 Venghaus ................ H01Q 1/42
2018/0375188 A1 * 12/2018 Patel .................... H01Q 1/1264
2020/0168989 A1 * 5/2020 Fukui ....................... H01Q 1/27
2020/0212999 A1 7/2020 Katagi
2020/0259250 A1 8/2020 Diamond et al.
2021/0249767 A1 * 8/2021 Greenwood ......... H01Q 21/061
2022/0200144 A1 * 6/2022 Shin ........................ H02J 50/10

FOREIGN PATENT DOCUMENTS

CN 105514607 A 4/2016
CN 105934852 A 9/2016
CN 106384889 A * 2/2017
JP 51132949 A 11/1976
JP 9284033 A 10/1997
JP 2004205411 A 7/2004
JP 2009284033 A 12/2009
WO WO2014/188752 11/2014

* cited by examiner

ANTENNA POSITIONER WITH ECCENTRIC TILT POSITION MECHANISM

CROSS REFERENCES

The present application for patent is a Continuation of U.S. patent application Ser. No. 16/960,314 by Zimmerman et al., entitled "ANTENNA POSITIONER WITH ECCENTRIC TILT POSITION MECHANISM" filed Jul. 6, 2020, which claims priority to PCT International Application No. PCT/US2019/021170 by Zimmerman, et al., entitled "ANTENNA POSITIONER WITH ECCENTRIC TILT POSITION MECHANISM" filed Mar. 7, 2019, which claims the benefit of U.S. Provisional Patent Application No. 62/640,386 by Zimmerman et al., entitled "ANTENNA POSITIONER WITH ECCENTRIC TILT POSITION MECHANISM," filed Mar. 8, 2018, each of which are assigned to the assignee hereof, and expressly incorporated by reference herein, in their entirety.

BACKGROUND

An antenna positioning system is generally used in a wireless communication system where an antenna is aligned in particular orientation to support establishing and maintaining a communication link with a target device. Target devices can include satellites, planes, ground-based vehicles, stationary ground-based targets and the like.

A positioning system for aligning an antenna boresight with target devices such as these may have particular performance requirements. For instance, to support communications with one or more target devices that may have a wide range of positions relative to an antenna, a positioning system may be required to provide a relatively large angular range (e.g., about one or more angular degrees of freedom) for tracking a target device. Under some scenarios, a positioning system may need to support a rate of actuation that is based on the relationship between a path or location of a target device and a location of the antenna, or a configuration of positioning axes of a positioning system.

In one example, when a positioning system is configured to orient an antenna boresight about an azimuth axis and an elevation axis (e.g., in an elevation-over-azimuth configuration), an overhead pass of a target device may present challenges in tracking of the target device. For example, an azimuth rate associated with tracking an overhead pass of a target device may be infinite (e.g., during a 180-degree transition in azimuth direction as the target device passes overhead at a 90-degree elevation angle). When a positioning system cannot support such a high azimuth rate, an associated system may drop a communication link with a target device until the positioning system is able to reposition the antenna boresight along a direction of the target device after the overhead pass. Such a loss of communication may limit, impair, or degrade the performance of such an antenna system.

SUMMARY

Methods, systems, and devices are described for antenna positioning with an eccentric tilt pointing mechanism. For example, a system in accordance with the present disclosure may include a base structure and an intermediate structure that is rotatably coupled with the base structure about a first axis (e.g., a tilt axis). The system may also include a positioning system that is coupled with the intermediate structure and configured to orient an antenna boresight about at least two angular degrees of freedom with respect to the intermediate structure, which, in some examples, may generally correspond to an azimuth positioning axis and an elevation positioning axis (e.g., in an elevation-over-azimuth configuration). The system may also include an actuator (e.g., a tilt actuator) between the base structure and the intermediate structure that is configured to set, change, or maintain an angle between the base structure and the intermediate structure, which, in some examples, may include a control or actuation that is based at least in part on a predicted path of a target device.

The actuator between the base structure and the intermediate structure may include a rotating element configured to rotate about a second axis (e.g., different from the first axis, non-coincident with the first axis, non-concentric with the first axis) and an eccentric element that is coupled with the rotating element and the intermediate structure. The eccentric element may be mounted to or otherwise connected to the rotating element at a position offset from the second axis by an eccentricity distance or offset. In some examples, to change an angle between the base structure and the intermediate structure, rotating the rotating element may change a distance between the base structure and the intermediate structure at a location offset from the first axis (e.g., by changing a position of the eccentric element relative to the base structure). In various examples, the eccentric element may include a pin engaged in a slot of the intermediate structure, or the eccentric element may be coupled with a first end of a linkage and the intermediate structure may be coupled with a second end of the linkage, or the eccentric element may take other forms or configurations for adjusting an angle between an intermediate structure and a base structure.

In some examples, controlling the actuator between the base structure and the intermediate structure may include actuating (e.g., rotating, driving, holding) the rotating element to set, change, or maintain a first angle between the base structure and the intermediate structure about the first axis, where the first angle may be determined based at least in part on a predicted path of a target device. The system may subsequently track the target device with an antenna boresight, while maintaining the first angle (e.g., maintaining an angular position of the rotating element), using the positioning system coupled with the intermediate structure. The system may select a second angle based at least in part on a second predicted path (e.g., a path of a different target device, a different path of the same target device), and track the target device with the antenna boresight while maintaining the second angle.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of various aspects of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to an antenna positioning apparatus, particularly one including an eccentric tilt position mechanism that can set, change, or maintain a relative angle (e.g., a tilt angle) between a base structure and an intermediate structure.

When an antenna positioning system is configured to orient an antenna boresight about one or more positioning axes, a target device that travels along a path that is coincident with one of the positioning axes may be difficult for the antenna positioning system to track. For example, when a positioning system is configured to orient an antenna boresight about an azimuth axis and an elevation axis (e.g., in an elevation-over-azimuth configuration), an azimuth rate associated with tracking an overhead pass of a target device may be infinite (e.g., during a 180-degree transition in azimuth direction as the target device passes overhead at a 90-degree elevation angle).

In accordance with the described techniques, an antenna positioning apparatus that includes an eccentric tilt position mechanism may support reorienting a positioning axis relative to a predicted path of a target device. By providing such a control of a relative angle between a base structure and an intermediate structure, a system that includes the described mechanisms can have favorable performance or design characteristics when compared to a system that lacks such mechanisms or relies on other types of positioners to overcome shortcomings associated with a positioning system that orients an antenna boresight about two rotational degrees of freedom.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various operations or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
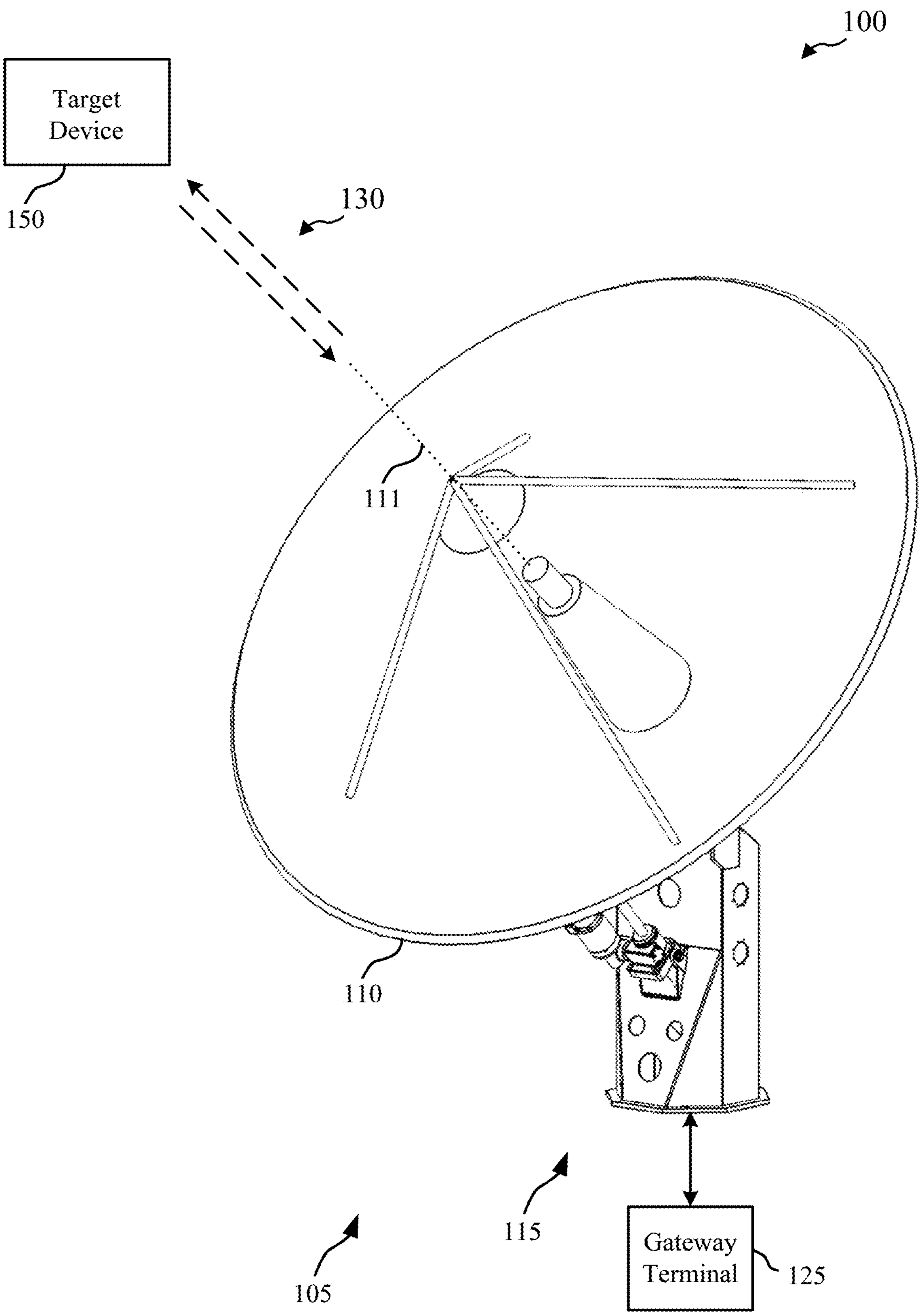
FIG. 1 shows a diagram of a wireless communication system in accordance with various aspects of the present disclosure.

FIG. 1 shows a diagram of a wireless communication system 100 in accordance with various aspects of the present disclosure. The wireless communication system 100 includes an antenna system 105, which may include an antenna 110 and an antenna positioning apparatus 115. The antenna 110 may be associated with an antenna boresight 111, which may refer to a direction of highest signal gain for the antenna 110 or a nominal pointing direction of the antenna 110. In some examples of the wireless communication system 100, it may be desirable to have an antenna boresight 111 pointed in a direction corresponding to the location of a target device 150. The target device 150 can be, for example, a satellite following an orbital path (e.g., geostationary orbit, low earth orbit, medium earth orbit, etc.). In other examples, the target device 150 may be an aircraft in flight, a terrestrial target, such as ground-based or water-based vehicle, or a moving or stationary ground-based antenna. The antenna 110 may provide communication with the target device 150 over communication link(s) 130, which can be one-way or two-way communication links.

In some examples, the antenna 110 may be part of a gateway system for a satellite communication system. The gateway system may include gateway terminal 125, which may be in communication with a network (not shown), such as a local area network (LAN), metropolitan area network (MAN), wide area network (WAN), or any other suitable public or private network, and may be connected to other communications networks such as the Internet, telephony networks (e.g., Public Switched Telephone Network (PSTN), etc.), and the like.

The orientation of the antenna 110 (e.g., of the antenna boresight 111) can be provided by an antenna positioning apparatus 115 (e.g., an antenna positioning system), which can adjust the orientation of the antenna 110 about two or more spatial axes. In some examples, the antenna positioning apparatus 115 may provide azimuth positioning of the antenna 110 (e.g., in a horizontal reference plane, in a tilted reference plane) and elevation positioning of the antenna 110 (e.g., vertically from a horizontal plane or tilted reference plane). In this manner, the antenna boresight 111 can be directed towards the target device 150 to increase the signal gain along the direction between the antenna 110 and the target device 150.

In some cases, an antenna positioning apparatus 115 may need to support a rate of actuation that is based on the relationship between a path of a target device 150 relative to the antenna system 105 (e.g., associated with dynamic travel) or a position of the target device 150 relative to the antenna system 105, and a configuration of positioning axes of the antenna positioning apparatus 115. For example, when an antenna positioning apparatus 115 is configured to orient the antenna boresight 111 about a vertical azimuth axis (e.g., an orientation in a horizontal plane) and a horizontal elevation axis (e.g., an orientation in a vertical direction from the horizontal plane) an azimuth rate associated with tracking an overhead pass of the target device 150 may be infinite. In other words, when a path of a target device 150 is coincident with the azimuth axis of an antenna positioning apparatus 115, the antenna positioning apparatus 115 may be required to provide an instantaneous 180-degree transition in azimuth direction to maintain alignment with the target device 150 when the target device 150 passes the azimuth axis along its path. Such scenarios may be particularly applicable when tracking target devices 150 such as medium earth orbit (MEO) and low earth orbit (LEO) satellites in polar orbits, where lower orbits and higher quantities of target satellites may be associated with higher occurrences of overhead passes.

In another example, tracking a geosynchronous satellite (e.g., another example of a target device 150) can be associated with similar problems if the terminal (e.g., including an antenna system 105) is located directly under the satellite. In such an example, wind or station keeping motion can cause the satellite to drift and require pointing corrections by the antenna positioning apparatus 115 (e.g., of the ground station). In various examples at a zenith, an azimuth axis may not provide an ability to support pointing corrections. Rather, under such scenarios, corrections may only be provided by an elevation axis, with azimuth used to move elevation between two orthogonal axes for correction.

When the antenna positioning apparatus 115 cannot support such a high azimuth rate or range of elevation angles, a communication link 130 with the target device 150 may be dropped (e.g., may cause a communications outage) until the antenna positioning apparatus 115 is able to reposition the antenna boresight 111 along a direction of the target device 150 (e.g., after an overhead pass, after reorienting an axis of the antenna positioning apparatus 115). Such a loss of communication may limit, impair, or degrade the performance of antenna system 105. Although some systems may use various techniques to overcome limitations in such positioning systems (e.g., X/Y positioners, a tilt wedge or train axis underneath an azimuth positioner, or a 3-axis elevation and cross-elevation over azimuth), such techniques may be associated with various shortcomings such as relatively high cost, complexity, or inaccuracy (e.g., due to component backlash).

In accordance with aspects of the present disclosure, the antenna system 105 (e.g., the antenna positioning apparatus 115) may include a base structure and an intermediate structure that is rotatably coupled with the base structure about a first axis (e.g., a tilt axis). The antenna system 105 may also include an actuator between the base structure and the intermediate structure that is configured to set, change, or maintain an angle between the base structure and the intermediate structure, which, in some examples, may include a control or actuation that is based at least in part on a predicted path of the target device 150. In some examples, an angle between the base structure and the intermediate structure may be selected from a set of angles, such as a discrete number of angular positions between the intermediate structure and the base structure, a discrete set of tilt angles).

In some examples, controlling the actuator may correspond to a first mode of the antenna system 105 (e.g., a tilt mode, a train mode, a repositioning mode, an idle mode that does not support communications) and tracking the target device 150 may correspond to a second mode of the antenna system 105 (e.g., a tracking mode, an active mode that supports communications). In some examples, the antenna system 105 (e.g., the antenna positioning apparatus 115) may maintain a relative angle between the intermediate structure and the base structure during the second mode, or may otherwise refrain from rotating the rotating element during the second mode. In some examples, the antenna system 105 may refrain from tracking a target device 150 during the first mode (e.g., when changing to a new tilt angle between tracking passes associated with a same or different target device 150). However, the antenna system 105 may actuate other positioning axes (e.g., about an elevation axis, about an azimuth axis) during the first mode, such as actuating to a nominal position (e.g., a nominal elevation angle, a nominal azimuth angle), actuating to a predicted position for another pass of a target device 150 (e.g., an elevation angle or azimuth angle associated with a target device 150 returning to view or otherwise supporting communications along a different, subsequent predicted path), or other actuations (e.g., to manage twist or windup of a cable bundle associated with the antenna system 105).

By including the described actuator between a base structure and an intermediate structure, the antenna system 105 may have improved support for maintaining a communication link 130 with a target device when compared to other systems. For example, the antenna system 105 may adjust the antenna positioning apparatus to adapt to different predicted paths of a target device 150, where such adaptation may reduce operational demands on the antenna positioning apparatus 115. In some examples, by setting an angle between the base structure and the intermediate structure, the antenna system 105 may support reduced elevation angles or reduced azimuth rates of the antenna positioning apparatus 115 while tracking a target device 150 with the antenna boresight 111, which may improve the ability of the antenna system 105 to maintain communication links 130 with a target device 150.

Although illustrated in the context of a ground-based gateway system, the described techniques for antenna positioning may also be applicable to mobile applications, such as a vehicle-mounted or satellite-mounted antenna 110, which may or may not be in communication with a gateway terminal 125. For example, the described mechanisms for selectively tilting an intermediate structure, or for otherwise selectively tilting an axis of an antenna positioning apparatus 115 associated with a positioning degree of freedom (e.g., in a non-tracking mode), may be used in an aircraft or satellite carrying an antenna 110 that may pass over a fixed or mobile target device 150. Thus, the described tilt mechanisms may be generally applied in various applications to selectively tilt a positioning axis of an antenna positioning apparatus based on a predicted path or position of a target device 150 relative to an antenna system 105, thereby preventing or reducing outages associated with the target device 150 being coincident or otherwise aligned with the positioning axis.

Figure 2:
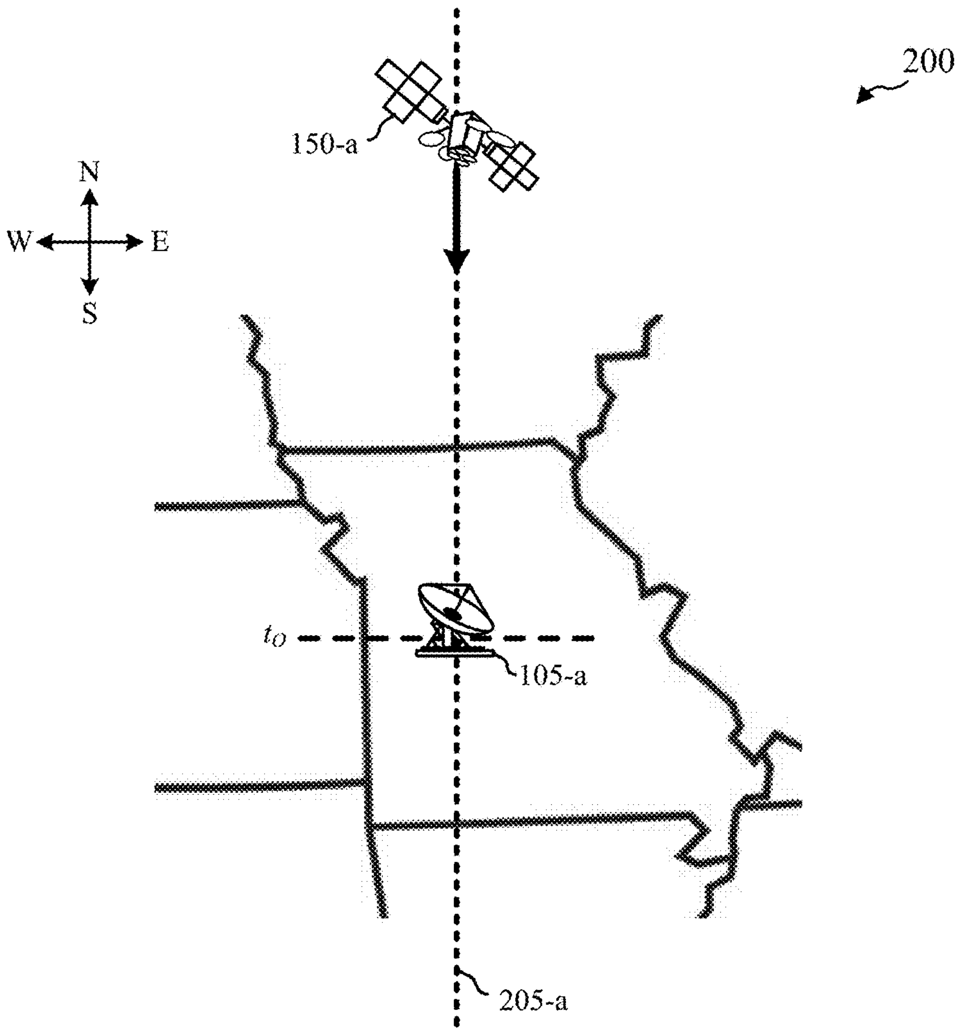
FIG. 2 illustrates an example of a target device a passing over an antenna system along a path in accordance with various aspects of the present disclosure.
Figure 2:
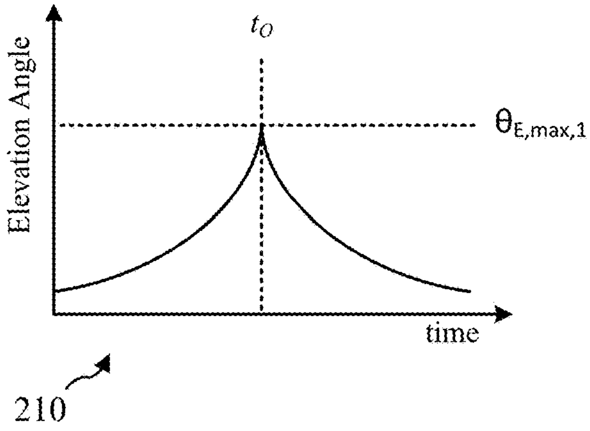
Figure 2:
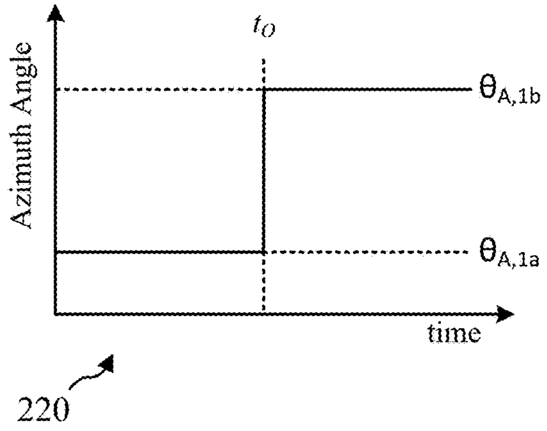

FIG. 2 illustrates an example 200 of a target device 150-*a* passing over an antenna system 105-*a* along a path 205-*a* in accordance with various aspects of the present disclosure. In the example 200, the target device 150-*a* may be a MEO or LEO satellite, and the antenna system 105-*a* may be a ground-based installation such as a component of a gateway system. The path 205-*a* associated with the target device 150-*a* may follow a generally or predominantly north-to-south orientation, which may be illustrative of a polar orbit.

To track the target device 150-*a* along the path 205-*a*, an antenna positioning apparatus 115 of the antenna system 105-*a* may be configured to point an antenna boresight 111 (not shown) of the antenna system 105-*a* along different elevation angles and azimuth angles over time. In the example 200, the antenna positioning apparatus 115 may be configured with an azimuth axis that is pointed directly overhead (e.g., perpendicular to a horizontal plane) such that the path 205-*a* coincides with the azimuth axis. In other words, a position of the target device 150-*a* may be coincident with the azimuth axis at to for an antenna system 105-*a* that is configured to have an azimuth axis pointed directly overhead.

In the case of example 200, the elevation angles of the antenna boresight 111 for tracking the target device 150-*a* over time may be illustrated by the elevation plot 210, and the azimuth angles of the antenna boresight 111 for tracking the target device 150-*a* over time may be illustrated by the azimuth plot 220. The elevation plot 210 and the azimuth plot 220 illustrate angles with reference to a time, to, corresponding to a time when the target device 150-*a* passes directly overhead. The antenna boresight 111 may begin with a northerly heading, which may correspond to an initial azimuth angle (e.g., $\theta_{A,1a}$) of zero degrees. The azimuth angle may remain at the initial azimuth angle until the overhead pass at to. While the target device 150-*a* proceeds along the path 205-*a*, prior to, the elevation angle may increase, and accelerate as the target device 150-*a* approaches the overhead position.

When the target device 150-*a* reaches the overhead position, the target device 150-*a* may be coincident with the azimuth axis of the antenna system 105-*a*. At this time, to track the target device 150-*a*, the elevation angle may reach a maximum value, $\theta_{E,max,1}$, which may equal 90 degrees. At the particular instant of the overhead pass (e.g., at to), any azimuth angle may support tracking the target device 150-*a*, because the antenna boresight 111 may be aligned with the target device 150-*a* at a 90-degree elevation angle. However, to support the tracking along the path 205-*a*, the time to may be associated with an instantaneous transition from the initial azimuth angle, $\theta_{A,1a}$, just prior to the time to to a final azimuth angle, $\theta_{A,1b}$, just after the time to, which in the example 200 may be 180 degrees. The time to may also be associated with an infinite pointing acceleration about one or both of the azimuth axis and the elevation axis of the antenna system 105-*a* (e.g., to support an instantaneous transition from a positive elevation rate to a negative elevation rate at to, to support an instantaneous transition from one azimuth position to another at to).

The antenna system 105-*a* (e.g., the antenna positioning apparatus 115) may not be able to support the azimuth rate required to maintain a communication link 130 during the transition from $\theta_{A,1a}$ to $\theta_{A,1b}$, or may not be able to support the maximum elevation angle $\theta_{E,max,1}$ (e.g., may not be able to support an elevation angle of 90 degrees), or may otherwise be unable to support the requested positioning velocities or accelerations at to. Thus, in accordance with examples of the present disclosure, the antenna system 105-*a* (e.g., an antenna positioning apparatus 115 of the antenna system 105-*a*) may include an eccentric tilt position mechanism to selectively or opportunistically avoid the conditions illustrated by the elevation plot 210 and the azimuth plot 220 when the target device 150-*a* follows the path 205-*a*.

Figure 3A:
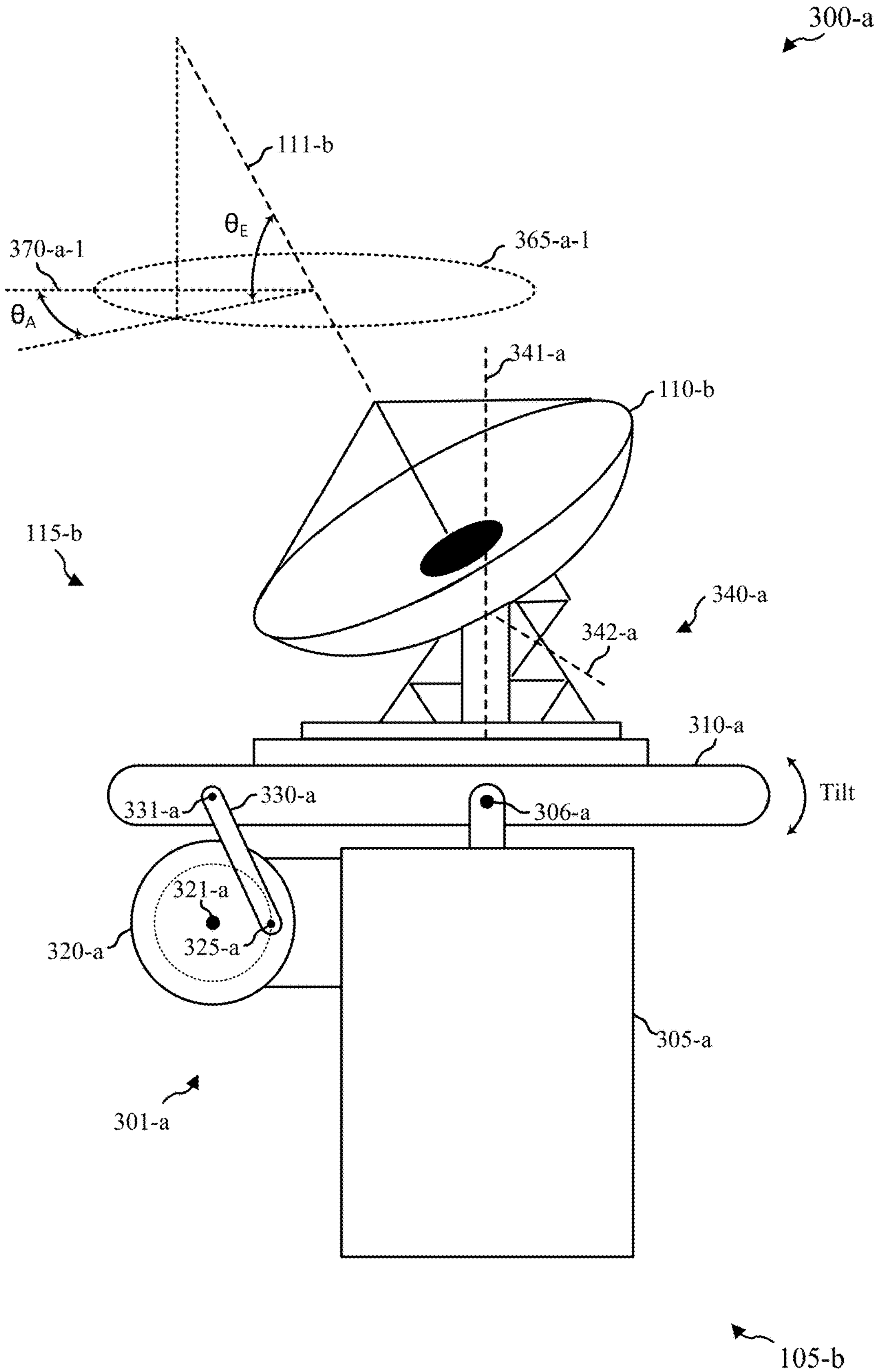
FIGS. 3A and 3B illustrate example configurations of an antenna system in accordance with various aspects of the present disclosure.
Figure 3B:
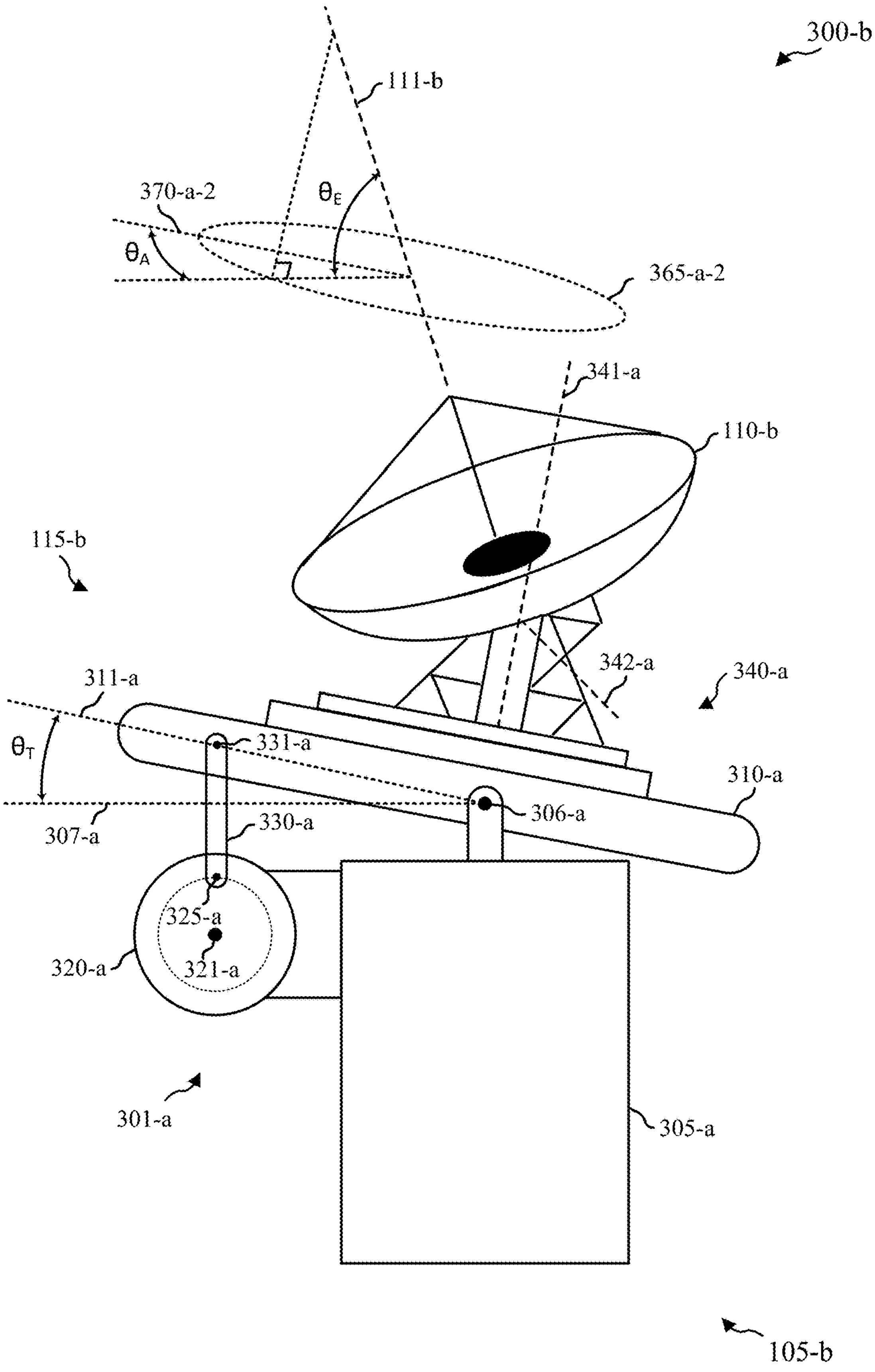

FIGS. 3A and 3B illustrate example configurations 300-*a* and 300-*b* of an antenna system 105-*b* in accordance with various aspects of the present disclosure. The antenna system 105-*b* includes an antenna 110-*b* having an antenna boresight 111-*b*, and an antenna positioning apparatus 115-*b* configured to orient the antenna boresight 111-*b* (e.g., towards a target device 150).

In the example of antenna system 105-*b*, the antenna positioning apparatus 115-*b* includes an antenna positioner 340-*a* (e.g., a positioning system, a tracking system) configured to orient the antenna boresight 111-*b* about two rotational degrees of freedom (e.g., relative to the intermediate structure 310-*a*, about a first positioning axis 341-*a* and a second positioning axis 342-*a*). In some examples, the first positioning axis 341-*a* may be described as an azimuth axis and the second positioning axis 342-*a* may be described as an elevation axis, though other nomenclature and configurations are possible in accordance with the described techniques. In some examples, the antenna positioner 340-*b* may include an elevation positioner and an azimuth positioner between the elevation positioner and the intermediate structure (e.g., in an elevation-over-azimuth configuration). In some examples, the antenna positioner 340-*a* may be further configured to rotate elements of the antenna 110-*b* about an axis parallel with the antenna boresight 111-*b* (e.g., a third rotational degree of freedom) to align the antenna 110-*b* according to vertical, horizontal, or other signal polarization.

In the example of antenna system 105-*b*, the antenna positioning apparatus 115-*b* also includes an illustrative example of an eccentric tilt position mechanism 301-*a* (e.g., an actuator, a tilt actuator). For example, the antenna system 105-*b* (e.g., the antenna positioning apparatus 115-*b*) includes a base structure 305-*a* and an intermediate structure 310-*a*, where the intermediate structure 310-*a* is rotatably coupled with the base structure 305-*a* about an axis 306-*a*. The rotatable coupling provides a degree of rotational freedom between the base structure 305-*a* and the intermediate structure 310-*a*, and may include any of a ball bearing, a roller bearing, a journal bearing, a bushing, a spherical bearing, a ball and socket joint, and the like. The base structure 305-*a* can be fixedly coupled to, for instance, the ground, or any other stationary or moving assembly, where the fixed coupling provides a fixed relationship between structures or objects. In various examples, the axis 306-*a* may be horizontal, or non-horizontal (e.g., when illustrating an implementation of a fixed, ground-based antenna system 105).

The eccentric tilt position mechanism 301-*a* includes a rotating element 320-*a* that is rotatably coupled with the base structure about an axis 321-*a*. In various examples, the axis 321-*a* may be horizontal, or non-horizontal, and the axis 321-*a* may be parallel to the axis 306-*a*, or non-parallel to the axis 306-*a*. The rotating element 320-*a* includes an eccentric element 325-*a* at a distance offset from the axis 321-*a*, which in the example of antenna system 105-*b* is a coupling attached to a first end of a linkage 330. A second end of the linkage 330-*a* may be attached to the intermediate structure 310-*a* at a coupling location 331-*a* that is offset from the axis 306-*a*. In other words, the linkage 330 illustrates an example for supporting the eccentric element 325-*a* being coupled (e.g., indirectly, via the linkage 330-*a*) with the intermediate structure 310-*a* at a location offset from the axis 306-*a*. Although the rotating element 320-*a* is illustrated as being rotatably coupled with the base structure 305-*a*, in other examples a rotating element 320-*a* of an eccentric tilt position mechanism 301-*a* may alternatively be rotatably coupled with the intermediate structure 310-*a* (e.g., swapping the relative position of the rotating element 320-*a* and the linkage 330-*a* between the base structure 305-*a* and the intermediate structure 310-*a*). Rotation of the rotating element 320-*a* can be provided by any suitable mechanism (e.g., a drive element) coupled with the rotating element 320-*a*, such as an electric motor, a gear motor, a hydraulic motor, and the like.

The configuration 300-*a* of FIG. 3A may illustrate a neutral or zero tilt position of the antenna positioning apparatus 115-*b* (e.g., of the eccentric tilt position mechanism 301). In other words, the first positioning axis 341-*a* may be in a vertical position, such that the antenna positioner 340-*a* provides control about a rotational degree of freedom that is measured in an illustrative plane 365-*a*-1 (e.g., a horizontal plane, perpendicular to the first positioning axis 341-*a*). Such a configuration may be illustrative of a typical or customary orientation of the antenna positioner 340-*a* for providing azimuth control about the first positioning axis 341-*a* and elevation control about the second positioning axis 342-*a*. For example, an azimuth angle $\theta_A$ of the antenna positioner 340-*a* may be measured between a projection of the antenna boresight 111-*b* in the plane 365-*a*-1 and any suitable reference, such as a nominal direction 370-*a*-1 in the plane 365-*a*-1, and an elevation angle $\theta_E$ of the antenna positioner 340-*a* may be measured as an angle between the antenna boresight 111-*b* and the plane 365-*a*-1.

The configuration 300-*a* of FIG. 3A may be illustrative of a configuration associated with the elevation plot 210 and the azimuth plot 220 of the example 200 described with reference to FIG. 2 (e.g., when tracking the target device 150-*a* through an overhead pass of the path 205-*a*). For example, during the overhead pass of the target device 150-*a* of example 200, the path 205-*a* may coincide with the first positioning axis 341-*a*. Thus, in the configuration 300-*a* of the antenna system 105-*b* (e.g., of the antenna positioning apparatus 115-*b*), tracking the target device 150-*a* along the path 205-*a* may be associated with an infinite positioning rate about the first positioning axis 341-*a*, or infinite angular acceleration about one or both of the first positioning axis 341-*a* or the second positioning axis 342-*a*, to maintain tracking of the antenna boresight 111-*b* with the target device 150-*a*.

In some examples, the antenna system 105-*b* (e.g., the antenna positioning apparatus 115-*b*) may be configured to selectively avoid the conditions illustrated by the elevation plot 210 and the azimuth plot 220 by actuating the eccentric tilt position mechanism 301 (e.g., rotating the rotating element 320-*a*). For example, to change from the configuration 300-*a* illustrated by FIG. 3A to the configuration 300-*b* illustrated by FIG. 3B, the antenna system 105-*b* may include a controller that controls rotation of the rotating element 320-*a* (e.g., via a drive element, not shown) based at least in part on various conditions associated with a predicted path. In various examples, the rotation of the rotating element 320-*a* may be based at least in part on one or more of a maximum elevation angle $\theta_E$ associated with tracking along a predicted path, a rate of change of azimuth angle $\theta_A$ associated with tracking along a predicted path (e.g., a maximum rate of change, a rate of change associated with a time to), an angular acceleration about one or both of the first positioning axis 341-*a* or the second positioning axis 342-*a* associated with tracking along a predicted path (e.g., a maximum acceleration, a tracking acceleration associated with a time to), a separation between the first positioning axis 341-*a* and a direction along a predicted path (e.g., an angular separation between the first positioning axis 341-*a* and a direction to the path 205 at time to), or some other characteristic associated with tracking a target device 150 along a predicted path. Thus, based on various conditions, the antenna system 105-*b* may rotate the rotating element 320-*a* to avoid the conditions illustrated in the example 200.

The configuration 300-*b* of FIG. 3B may illustrate a tilted or non-zero tilt position of the antenna system 105-*b* (e.g., of the eccentric tilt position mechanism 301-*a*). For example, by rotating the rotating element 320-*a* from the position illustrated by the configuration 300-*a* of FIG. 3A to the position illustrated by the configuration 300-*b* of FIG. 3B, the eccentric element 325-*a*, and therefore the linkage 330-*a*, may be moved vertically (e.g., upward), causing a corresponding or responsive change in distance between the base structure 305-*a* and the intermediate structure 310-*a* at the coupling location 331-*a*. In other words, by moving the coupling location 331-*a* upward in relation to the base structure 305-*a*, the intermediate structure 310-*a* may rotate about the axis 306-*a*, causing a tilt of the intermediate structure by a tilt angle, OT, as shown.

In the example of antenna system 105-*b*, the tilt angle $\theta_T$ may be measured between a base structure reference line 307-*a* associated with (e.g., fixed to, aligned with) the base structure 305-*a* and an intermediate structure reference line 311-*a* associated with (e.g., fixed to, aligned with) the intermediate structure 310-*a*. Although base structure reference line 307-*a* is illustrated as a line passing through axis 306-*a* and intermediate structure reference line 311-*a* is shown as being a line passing through axis 306-*a* and coupling location 331-*a*, the tilt angle $\theta_T$ can be measured or illustrated with respect to any reference point of the intermediate structure 310-*a* and the base structure 305-*a* or other reference point, line, or plane to convey a change in rotation or angle of the intermediate structure 310-*a* about the axis 306-*a* (e.g., relative to the base structure 305-*a*).

In some examples, one or both of the base structure reference line 307-*a* or the intermediate structure reference line 311-*a* may be perpendicular to the axis 306-*a*. In some examples, the base structure reference line 307-*a* may be coplanar with the intermediate structure reference line 311-*a* (e.g., in a plane that is perpendicular to the axis 306-*a*). In some examples (e.g., when the antenna system 105-*b* is associated with a ground based system), the base structure reference line 307-*a* may be a horizontal line. In some examples, the intermediate structure reference line 311-*a* may also be horizontal when the intermediate structure 310-*a* is in a particular orientation (e.g., at a neutral tilt position, when the positioning axis 341-*a* is vertically aligned, when tilt angle $\theta_T$=0).

In another example (not shown), the intermediate structure reference line 311-*a* may be parallel to or coincident with the positioning axis 341-*a*, and the base structure reference line 307-*a* may be parallel to or coincident with the intermediate structure reference line 311-*a* when the intermediate structure 310-*a* is in a particular orientation (e.g., a neutral tilt angle or position). For example, when the antenna system 105-*b* is associated with a ground based system, the base structure reference line 307-*a* may be a vertical line, and one or both of the intermediate structure reference line 311-*a* or the positioning axis 341-*a* may also be in a vertical alignment at a middle or neutral tilt position or angle. However, various other reference conventions may be used to describe rotation or angles between an intermediate structure 310 and a base structure 305. For example, the intermediate structure reference line 311-*a* may be more generally associated with a reference direction where, when the intermediate structure 310-*a* is in a particular orientation (e.g., a middle tilt position or angle, a position or angle associated with the first positioning axis 341-*a* being in a particular orientation), the intermediate structure reference line 311-*a* is parallel to or coincident with the base structure reference line 307-*a* (e.g., corresponding to a zero or neutral tilt angle).

The rotation of the intermediate structure 310-*a* about the axis 306-*a* may cause a corresponding tilt of the first positioning axis 341-*a*, which may be fixed in relation to the intermediate structure 310-*a*. Accordingly, the antenna positioner 340-*a* may provide control about a rotational degree of freedom that is measured in a plane 365-*a*-2 (e.g., perpendicular to the first positioning axis 341-*a*) that is not horizontal. Such a configuration may be illustrative of a tilted orientation (e.g., of the antenna positioner 340-*a*) for providing azimuth control about the first positioning axis 341-*a* and elevation control about the second positioning axis 342-*a*. For example, according to the configuration 300-*b* of FIG. 3B, an azimuth angle $\theta_A$ of the antenna positioner 340-*a* may be measured between a projection of the antenna boresight 111-*b* and a nominal direction 370-*a*-2 in the plane 365-*a*-2 and an elevation angle $\theta_A$ of the antenna positioner 340-*a* may be measured as an angle between the antenna boresight 111-*b* and the plane 365-*a*-2, where the plane 365-*a*-2 is tilted from horizontal by an angle of $\theta_T$. Although the plane 365-*a*-2 may be tilted at the same angle as the intermediate structure 310-*a*, the second positioning axis 342-*a* may or may not be parallel to the axis 306-*a*. For example, when viewed along the first positioning axis 341-*a*, the second positioning axis 342-*a* may be separated from the axis 306-*a* by an angle that corresponds to a positioning angle about the first positioning axis 341-*a* (e.g., an azimuth positioning angle). In other words, a positioning about the first positioning axis 341-*a* may change an angular orientation of the second positioning axis 342-*a* relative to the axis 306-*a*.

The configuration 300-*b* of FIG. 3B may be illustrative of a configuration of the antenna positioning apparatus 115-*b* that avoids certain characteristics of the elevation plot 210 and the azimuth plot 220 when tracking the target device 150-*a* through an overhead pass. For example, according to the configuration 300-*b* of FIG. 3B, when the axis 306-*a* is aligned along a north-south direction, the tilt angle $\theta_T$ may be used to tilt the first positioning axis 341-*a* towards an east or west direction. Thus, the tilted first positioning axis 341-*a* may not coincide with the path 205-*a*, and the tilting of the antenna positioner 340-*a* may support more benign operation of the antenna positioner 340-*a*. For example, in the context of the example 200, the tilted orientation of configuration 300-*b* may be associated with a reduced elevation angle (e.g., by an amount of $\theta_T$) and a reduced rate of change of azimuth angle $\theta_A$ when compared to the neutral orientation of configuration 300-*a*. Thus, based on various conditions, the antenna system 105-*b* (e.g., the antenna positioning apparatus 115-*b*) may rotate the rotating element 320-*a* based on the prediction or other understanding of the path 205 to provide the tilted orientation of configuration 300-*b*, and thereby avoid the conditions illustrated in the elevation plot 210 and the azimuth plot 220 of the configuration 300-*a*.

An eccentric tilt position mechanism such as the eccentric tilt position mechanism 301-*a* described with reference to FIGS. 3A and 3B may be configured according to various design characteristics that may be beneficial to operation of the antenna system 105-*b*. For example, it may be advantageous to track a target device 150 when the eccentric element 325-*a* is held at a vertically upper position (e.g., where the eccentric element 325-*a* is vertically above the axis 321-*a*, as illustrated in configuration 300-*b* of FIG. 3B) or at a vertically lower position (e.g., where the eccentric element 325-*a* is vertically below the axis 321-*a*, not shown, such as when the rotating element 320 is rotated 180 degrees from the configuration 300-*b* of FIG. 3B). In various examples, the rotating element 320-*a* may be held at an operating position for a particular time period, such as a duration or mode associated with tracking a target device 150 using the antenna positioner 340-*a*, where such a holding may be supported passively (e.g., by way of friction) or actively (e.g., by way of a controllable brake or lock). In some examples, such a configuration of the eccentric element 325-*a* may reduce the effect of backlash on pointing accuracy. For example, when the eccentric tilt position mechanism 301-*a* includes a drive element or other mechanism associated with rotational backlash of the rotating element 320-*a*, the effect of such backlash on pointing accuracy may be minimized when the eccentric element 325-*a* is vertically aligned with the axis 321-*a*, since the predominantly side-to-side movement of the eccentric element 325-*a* at such positions (e.g., in response to toggling within a range of backlash) may cause relatively little rotation of the intermediate structure 310-*a* about the axis 306-*a*. By way of contrast, when the eccentric element 325-*a* is horizontally aligned with the axis 321-*a* (e.g., as illustrated in the configuration 300-*a* of FIG. 3A), the predominantly up-and-down movement of the eccentric element 325-*a* at such positions in response to backlash of the rotating element 320-*a* may cause relatively large rotations of the intermediate structure 310-*a* about the axis 306-*a*.

Further, an eccentric geometry such as the geometry illustrated in the antenna system 105-*b* may be associated with relatively low angular velocity of the intermediate structure 310-*a* at the positions where the eccentric element 325-*a* is near a vertical alignment with the axis 321-*a*. In other words, because the movement of the eccentric element 325-*a* (e.g., due to a driven rotation of the rotating element 320-*a*) is predominantly in a side-to-side direction at such positions, a rotation (e.g., angular velocity) of the rotating element 320-*a* may translate into relatively slower rotation of the intermediate structure 310-*a*. By way of contrast, the movement of the eccentric element 325-*a* (e.g., due to a driven rotation of the rotating element 320-*a*) may be predominantly up-and-down when the eccentric element 325-*a* is near a horizontal alignment with the axis 321-*a*, such that a rotation of the rotating element 320-*a* may translate into relatively faster rotation of the intermediate structure 310-*a*. Thus, the illustrated geometry may facilitate the intermediate structure 310-*a* easing in to an operating position (e.g., at or near where the eccentric element 325-*a* is vertically aligned with the axis 321-*a*) with a relatively lower angular velocity of the intermediate structure 310-*a*.

Such a geometry may also provide a favorable mechanical advantage for a drive element configured to drive the rotating element 320-*a*, such as moving away from a particular operating point, approaching a particular operating point, or holding a particular operating point. In other words, when the eccentric element 325-*a* is vertically aligned with the axis 321-*a*, the intermediate structure 310-*a*, and any components mounted thereto, may present relatively little resistance to a driven rotation of the rotating element 320-*a*. For example, a drive element may be configured with relatively lower torque to provide angular acceleration of the intermediate structure 310-*a* (e.g., about the axis 306-*a*), angular deceleration of the intermediate structure 310-*a*, or torque to maintain an angular position of the intermediate structure 310-*a* near operating points where the eccentric element 325-*a* is vertically aligned with the axis 321-*a*, as compared with the positions where the eccentric element 325-*a* is horizontally aligned with the axis 321-*a*, which may be associated with relatively little angular acceleration of the intermediate structure 310-*a* (e.g., because angular velocity of the intermediate structure 310-*a* may have already been developed when the rotating element 320-*a* passes through such orientations between one operating position and another).

Thus, for these and other reasons, the antenna positioning apparatus 115-*b* may be configured to choose (e.g., in a control algorithm) to operate the eccentric tilt position mechanism 301-*a* at either one of the two positions (e.g., a discrete set of positions) where the eccentric element 325-*a* and the axis 321-*a* are vertically aligned, or are nearly vertically aligned.

In some examples, backlash of the eccentric tilt position mechanism 301-*a* may be further limited by providing a preload in the eccentric tilt positioning mechanism. In one example of such a preload, the angular movement of the rotating element 320-*a* may be limited by physical stops, which may correspond to the positions where the eccentric element 325-*a* is vertically aligned with the axis 321-*a*, or is nearly vertically aligned. In various examples, the rotating element 320-*a* may be loaded into such physical stops passively (e.g., as driven by gravity acting on various components of the antenna system 105-*b*), actively (e.g., as driven by a drive element or other driveline providing a torque to the rotating element 320-*a*), or a combination thereof. For example, some backlash of the eccentric tilt position mechanism 301-*a* may be biased out by weight of the intermediate structure 310-*a*, and components mounted thereto, when the axis 306-*a* is vertically aligned with a center of gravity of such components, and an angular position of the rotating element 320-*a* may be maintained with a torque bias of the rotating element 320-*a* against a physical stop (e.g., as provided by a drive element). In some examples, such loading may be driven into a compliant member, which may store potential energy in the form of a compressive, tensile, or torsional preload (e.g., storing a preload) which may mitigate backlash between various components in the antenna system 105-*b*. In some examples, such techniques may be associated with improved repeatability or pointing precision, because the described extremes of travel (e.g., as preloaded into a mechanical stop or travel limitation) may be associated with increased mechanical stiffness or reduced backlash. By way of contrast, an antenna system that includes a train axis, such as a rotating wedge, may have no weight bias removal of backlash, and wind loading of such an antenna system may toggle backlash in such a system, thereby resulting in pointing inaccuracies that would be avoided by employing the described techniques for tilting an antenna positioner 340-*a*.

In some examples, an eccentric tilt position mechanism 301-*a* may be configured to operate at one of two tilt angles, and either hold at a tilt angle or change to the other tilt angle based at least in part on a predicted path of a target device 150. In an illustrative example, an eccentric tilt position mechanism 301-*a* may be configured to operate at a tilt angle $\theta_T$ of either 7.5 degrees or −7.5 degrees, which, in some examples, may correspond to angular positions of the rotating element 320-*a* where the eccentric element 325-*a* and the axis 321-*a* are vertically aligned, or nearly vertically aligned. In an example where the eccentric tilt position mechanism 301 supports a tilt velocity of 6 degrees per second, the antenna positioner 340-*a* may thus be tilted from one tilt position to the other in 2.5 seconds (e.g., by rotating the rotating element 320-*a* by 180 degrees, or nearly 180 degrees, in 2.5 seconds). By way of contrast, an antenna system that includes a rotating wedge may require 30 seconds or more to make such a change in tilt positions (e.g., to rotate the rotating wedge by 180 degrees about a vertical axis).

In various examples, the described techniques for eccentric tilt positioning may include other advantages. For example, configuring a small angular range for tilt motion may be advantageous for high reliability cable routing, such as an azimuth cable loop, as compared to other techniques. Further, a pivot clevis associated with the axis 306-*a* may be configured to carry radial, thrust, and moment loads, and may utilize low-cost and readily available bearings, such as automotive-type tapered roller bearings. An antenna system with a train axis with a rotating wedge, on the other hand, may require sizing much larger hollow ring bearings in the drive that rotates the wedge.

Figure 4A:
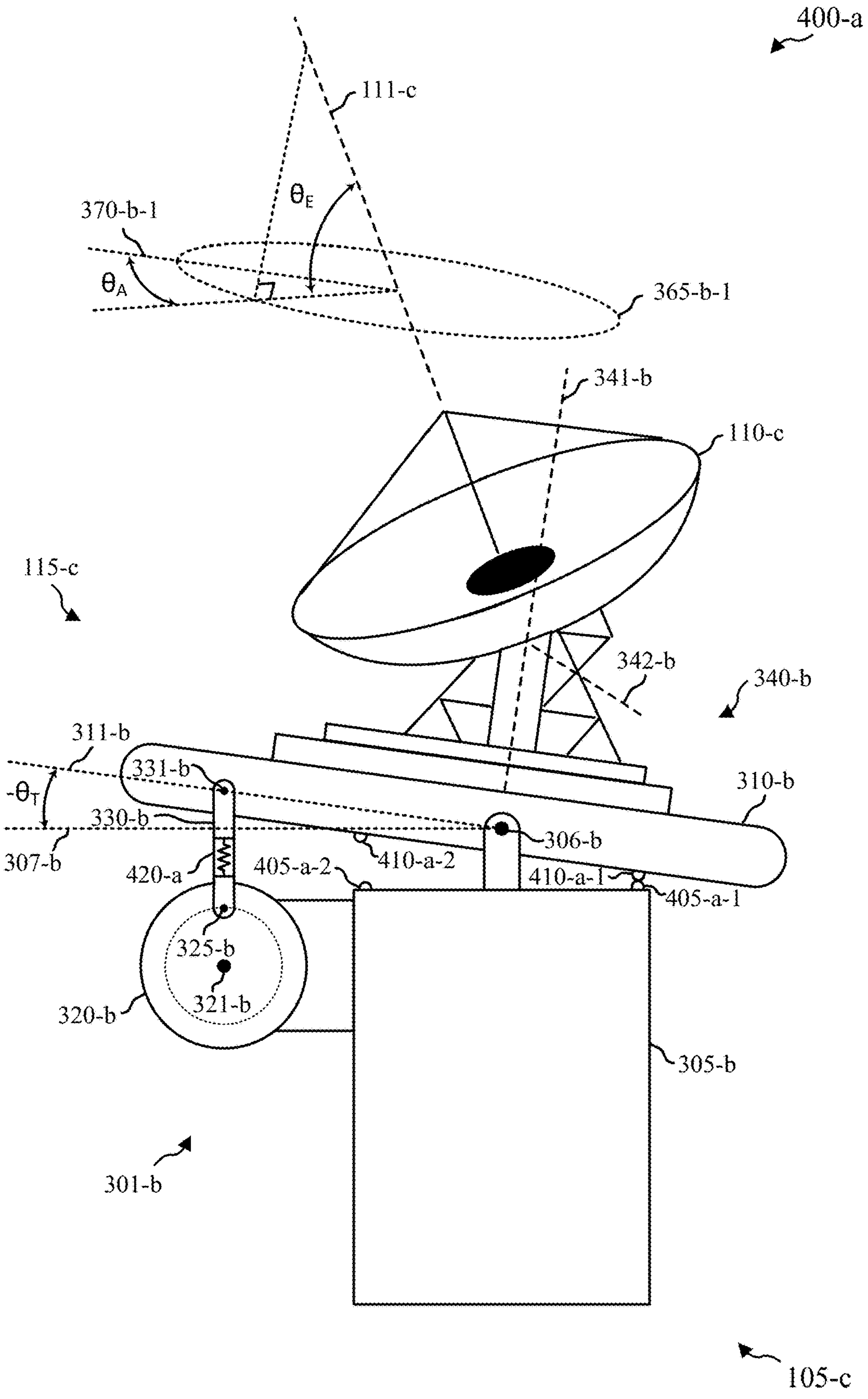
FIGS. 4A and 4B illustrate example configurations of an antenna system in accordance with various aspects of the present disclosure.
Figure 4B:
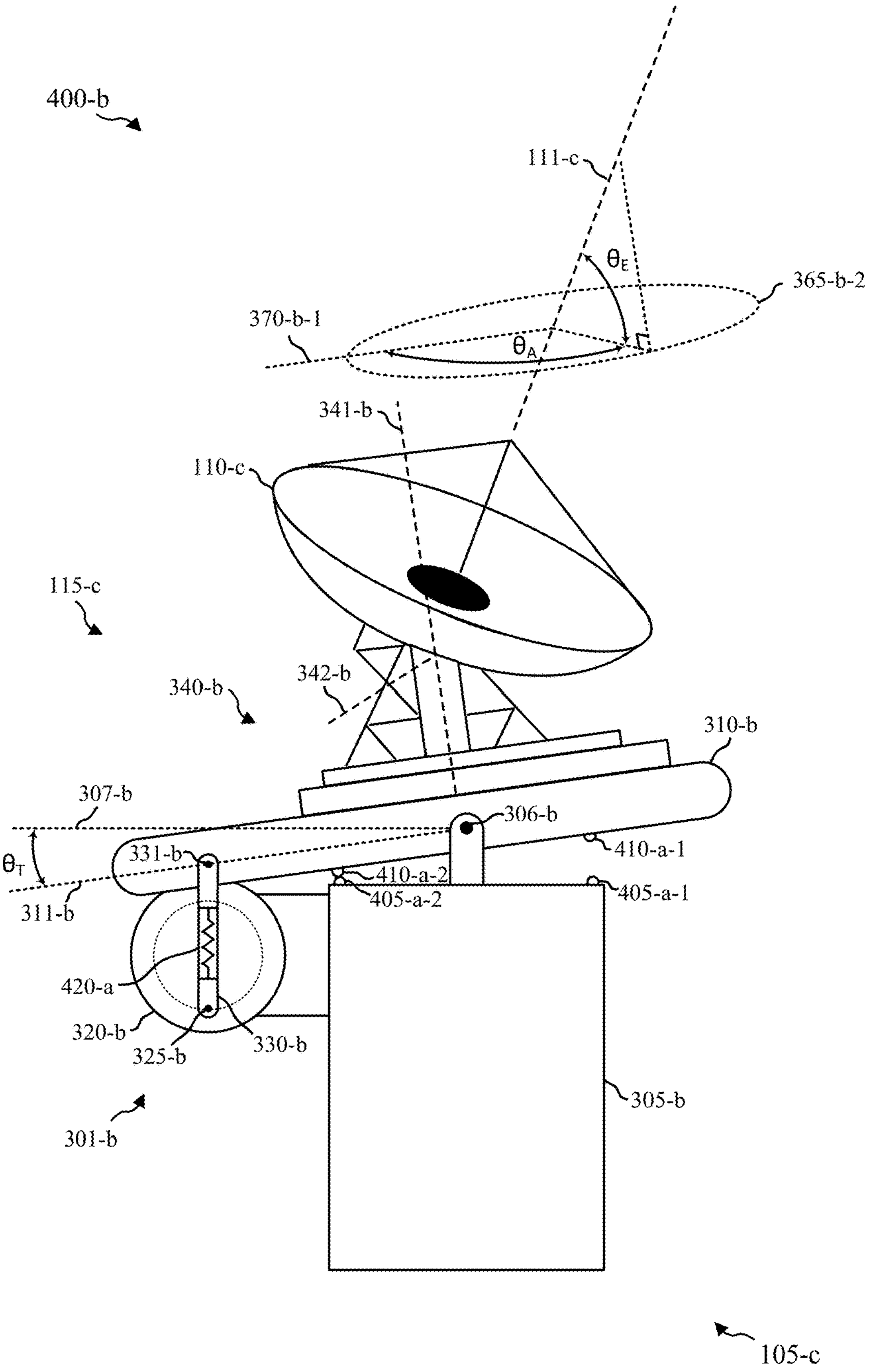

FIGS. 4A and 4B illustrate example configurations 400-*a* and 400-*b* of an antenna system 105-*c* in accordance with various aspects of the present disclosure. The antenna system 105-*c* includes an antenna 110-*c* having an antenna boresight 111-*c*, and an antenna positioning apparatus 115-*c* configured to orient the antenna boresight 111-*c* (e.g., towards a target device 150).

In the example of antenna system 105-*c*, the antenna positioning apparatus 115-*c* includes an antenna positioner 340-*b* (e.g., a positioning system, a tracking system) configured to orient the antenna boresight 111-*c* about two rotational degrees of freedom (e.g., about a first positioning axis 341-*b* and a second positioning axis 342-*b*). In some examples, the first positioning axis 341-*b* may be described as an azimuth positioning axis and the second positioning axis 342-*b* may be described as an elevation positioning axis, though other nomenclature and configurations are possible in accordance with the described techniques. In some examples, the antenna positioner 340-*b* may include an elevation positioner and an azimuth positioner between the elevation positioner and the intermediate structure (e.g., in an elevation-over-azimuth configuration). In some examples, the antenna positioner 340-*b* may be further configured to rotate the antenna 110-*c* about an axis parallel with the antenna boresight 111-*c* (e.g., a third rotational degree of freedom) to align the antenna according to vertical, horizontal, or other signal polarization.

Although configurations 400-*a* and 400-*b* are illustrated as having the antenna boresight 111-*c* pointing in opposite azimuth directions, in various examples, the configurations 400-*a* and 400-*b* may or may not be associated with a capability or configuration to track a target device 150 about a full range of azimuth angles. For example, each of configurations 400-*a* and 400-*b* may support pointing of the antenna boresight 111-*c* in 360 degrees of azimuth, so long as the required elevation angle to track a target device 150 is supported by the antenna positioner 340-*a*, and the positioning axis 341-*a* is not less than a threshold separation from a path 205 of the target device 150. If such conditions are not met for one of the configurations 400-*a* or 400-*b*, a controller of the antenna system 105 may selectively move to the other of the configurations 400-*a* or 400-*b*.

In the example of antenna system 105-*c*, the antenna positioning apparatus 115-*c* includes an illustrative example of an eccentric tilt position mechanism 301-*b* (e.g., an actuator, a tilt actuator). For example, the antenna system 105-*c* (e.g., the antenna positioning apparatus 115-*c*) includes a base structure 305-*b* and an intermediate structure 310-*b*, where the intermediate structure 310-*b* is rotatably coupled with the base structure 305-*b* about an axis 306-*b*. The rotatable coupling provides a degree of rotational freedom between the base structure 305-*b* and the intermediate structure 310-*b*. In various examples, the axis 306-*b* may be horizontal, or non-horizontal (e.g., when illustrating an implementation of a fixed, ground-based antenna system 105).

In the example of antenna system 105-*c*, the tilt angle $\theta_T$ may be measured between a base structure reference line 307-*b* associated with (e.g., fixed to, aligned with) the base structure 305-*b* and an intermediate structure reference line 311-*b* associated with (e.g., fixed to, aligned with) the intermediate structure 310-*b*. Although shown as being measured between a particularly located base structure reference line 307-*b* and a particularly located intermediate structure reference line 311-*b*, the tilt angle $\theta_T$ can be measured or illustrated with respect to any reference point of the intermediate structure 310-*b* and the base structure 305-*b* or other reference point, line, or plane to convey a change in rotation or angle of the intermediate structure 310-*b* about the axis 306-*b* (e.g., relative to the base structure 305-*b*).

The eccentric tilt position mechanism 301-*b* also includes a rotating element 320-*b* that is rotatably coupled with the base structure about an axis 321-*b*. In various examples, the axis 321-*b* may be horizontal, or non-horizontal, and the axis 321-*b* may be parallel to the axis 306-*b*, or non-parallel to the axis 306-*b*. The rotating element 320-*b* includes an eccentric element 325-*b* at a distance offset from the axis 321-*b*, which in the example of antenna system 105-*c* is a coupling attached to a first end of a linkage 330-*b*. A second end of the linkage 330-*b* may be attached to the intermediate structure 310-*b* at a coupling location 331-*b* that is offset from the axis 306-*b*. In other words, the linkage 330-*b* illustrates an example for supporting the eccentric element 325-*b* being coupled (e.g., indirectly, via the linkage 330-*b*) with the intermediate structure 310-*b* at a location offset from the axis 306-*b*. Although the rotating element 320-*b* is illustrated as being rotatably coupled with the base structure 305-*b*, in other examples a rotating element 320 of an eccentric tilt position mechanism 301 may alternatively be rotatably coupled with the intermediate structure 310-*b* (e.g., swapping the relative position of the rotating element 320-*b* and the linkage 330-*b* between the base structure 305-*b* and the intermediate structure 310-*b*).

In the example of antenna system 105-*c*, the relative rotation or angle between the base structure 305-*b* and the intermediate structure 310-*b* about the axis 306-*b* may be limited at a first angle (e.g., a negative tilt angle, $-\theta_T$, as illustrated in configuration 400-*a* of FIG. 4A) by a physical contact between a contact point 405-*a*-1 of the base structure 305-*b* and a corresponding contact point 410-*a*-1 of the intermediate structure 310-*b*. Further, the relative rotation or angle between the base structure 305-*b* and the intermediate structure 310-*b* about the axis 306-*b* may be limited at a second angle (e.g., a positive tilt angle, $\theta_T$, as illustrated in configuration 400-*b* of FIG. 4B) by a physical contact between a contact point 405-*a*-2 of the base structure 305-*b* and a corresponding contact point 410-*a*-2 of the intermediate structure 310-*b*. In some examples, the intermediate structure 310-*b* may be preloaded into one of the contact point 405-*a*-1 or the contact point 405-*a*-2 by active means, passive means, or a combination thereof, which may reduce or eliminate pointing errors associated with backlash (e.g., of the eccentric tilt position mechanism 301-*b*). In some examples, providing contact points 405-*a* or 410-*a* may improve repeatability or precision of tilt positioning, and therefore improve accuracy of tracking of the antenna boresight 111-*c*, by supporting the rotation of the intermediate structure 310-*b* relative to the base structure 305-*b* to repeatable positions. For example, the described extremes of travel (e.g., as preloaded between contact points 405-*a* and 410-*a*) may be associated with increased mechanical stiffness or reduced backlash. In some examples, the antenna system 105-*c* may be configured to select one of the configurations 400-*a* or 400-*b* (e.g., based on a predicted or otherwise determined path 205) for positioning operations associated with actively tracking a target device 150. In some examples, the antenna system 105-*c* may be configured to selectively avoid holding a position between the configurations 400-*a* or 400-*b* (e.g., selectively avoiding a neutral or zero tilt configuration) while tracking a target device 150.

The example of antenna system 105-*c* illustrates an example where the eccentric element 325-*b* is coupled with the intermediate structure 310-*b* via a compliant element 420-*a*. For example, the compliant element 420-*a* may be a spring that is a subcomponent of, or integrally formed with the linkage 330-*b*. Although illustrated as forming a middle portion of the linkage 330-*b*, a compliant element 420 in accordance with the disclosed techniques may be physically located at any location between the eccentric element 325-*b* and the coupling location 331-*b*, including a direct physical connection with one or both of the eccentric element 325-*b* or the coupling location 331-*b*. In various examples, the compliant element 420-*a* may include a coil spring, a beam spring, a leaf spring, an elastomeric bushing, an air spring, or any other component or combination of components that provides a variable force (e.g., based at least in part on a relative displacement the eccentric element 325-*b* and the coupling location 331-*b*, or other displacement between the eccentric element 325-*b* and the intermediate structure 310-*b*). In various examples, the linkage 330-*b*, in whole or in part, be configured or otherwise considered to be a compliant element 420-*a* (e.g., the linkage 330-*b* and the compliant element 420-*a* may be one in the same). For example, the linkage 330-*b* may be formed, in whole or in part, with an elastomeric or otherwise compliant or deformable material or component.

In various examples, the compliant element 420-*a* may be configured to store a preload (e.g., a compressive preload, a tensile preload, a bending preload, a torsional preload) based at least in part on an angular displacement of the rotating element 320-*b* about the axis 321-*b*. For example, when rotating the rotating element 320-*b* (e.g., actuating the eccentric tilt position mechanism 301-*b*) to reach the configuration 400-*a* illustrated in FIG. 4A, the linkage 330-*b* may push the coupling location 331-*b* upward, rotating the intermediate structure 310-*b* about the axis 306-*b* until the intermediate structure 310-*b* (e.g., the contact point 410-*a*-1) contacts the contact point 405-*a*-1 of the base structure 305-*b*. The intermediate structure 310-*b* may reach the contact point 405-*a*-1 before the eccentric element 325-*b* is vertically aligned with (e.g., directly above) the axis 321-*b*, and further rotation of the rotating element 320-*b* to such an alignment may compress the compliant element 420-*a* (e.g., due to a reduced separation between the eccentric element 325-*b* and the coupling location 331-*b*) while physical contact between the contact point 405-*a*-1 of the base structure 305-*b* and the corresponding contact point 410-*a*-1 of the intermediate structure 310-*b* is maintained. Thus, in the configuration 400-*a* illustrated in FIG. 4A, the compliant element 420-*a* may store a compressive preload in response to the rotating element 320-*b* causing the contact point 410-*a*-1 to be driven into the contact point 405-*a*-1.

In another example, when rotating the rotating element 320-*b* (e.g., actuating the eccentric tilt position mechanism 301-*b*) to reach the configuration 400-*b* illustrated in FIG. 4B, the linkage 330-*b* may pull the coupling location 331-*b* downward (or may resist a downward motion of the intermediate structure 310-*b* as driven by gravity), such that the intermediate structure 310-*b* rotates about the axis 306-*b* until the intermediate structure 310-*b* (e.g., contact point 410-*a*-2) contacts the contact point 405-*a*-2 of the base structure 305-*b*. The intermediate structure 310-*b* may reach the contact point 405-*a*-2 before the eccentric element 325-*b* is vertically aligned with (e.g., directly below) the axis 321-*b*, and further rotation of the rotating element 320-*b* to such an alignment may extend or elongate the compliant element 420-*a* (e.g., due to an increased separation between the eccentric element 325-*b* and the coupling location 331-*b*) while physical contact between the contact point 405-*a*-2 of the base structure 305-*b* and the corresponding contact point 410-*a*-2 of the intermediate structure 310-*b* is maintained. Thus, in the configuration 400-*b* illustrated in FIG. 4B, the compliant element 420-*a* may store a tensile preload in response to the rotating element 320-*b* causing the contact point 410-*a*-2 to be driven into the contact point 405-*a*-2.

In various examples, storing a preload in the compliant element 420-*a* may reduce the effect of backlash in various components of the antenna positioning apparatus 115-*c*. For example, loose physical contact (e.g., "play") between components may exist at any one or more of the axis 306-*b* (e.g., a direct coupling between the base structure 305-*b* and the intermediate structure 310-*b*), the axis 321-*b* (e.g., a direct coupling between the rotating element 320-*b* and the base structure 305-*b*), the eccentric element 325-*b* (e.g., a direct coupling between the eccentric element 325-*b* and the rotating element 320-*b*, a direct coupling between the eccentric element 325-*b* and the linkage 330-*b*), or the coupling location 331-*b* (e.g., a direct coupling between the linkage 330-*b* and the intermediate structure 310-*b*). By storing a preload in the compliant element 420-*a*, physical contact between components may be biased or loaded to a particular position so that such components are not free to move, or at least are able to resist some load, force, or other toggling movement. For example, such a preload may prevent toggling between components of the eccentric tilt position mechanism 301 in response to operational winds that are incident on the antenna system 105-*c*.

By storing a preload in the compliant element 420-*a*, relative motion between the intermediate structure 310-*b* and the base structure 305-*b* may be reduced or eliminated (e.g., at an operating point where preload is stored, such as the configurations 400-*a* and 400-*b* illustrated in FIGS. 4A and 4B), which may improve pointing accuracy of the antenna boresight 111-*c* due to the more stable platform (e.g., the intermediate structure 310-*b*) provided for the antenna positioner 340-*b*. Because such a system is less sensitive to backlash in various components, such an arrangement may permit the use of simplified or lower-cost components, such as lower tolerance bearings, couplings, or bushings at various connection points. Further, by including a compliant preload against contact points 405 or 410, the antenna system 105-*c* may have an improved factor of safety relative to operational factors such as extreme winds that are above operational wind loading.

The configurations 400-*a* and 400-*b* of FIGS. 4A and 4B may be illustrative of two different configurations of the antenna positioning apparatus 115-*c* that may avoid certain characteristics of the elevation plot 210 and the azimuth plot 220 described with reference to FIG. 2 when tracking a target device 150-*a* through an overhead pass. For example, when the axis 306-*b* is aligned along a north-south direction (e.g., when looking in a northerly direction into the page of FIG. 4A or 4B), the tilt angle $-\theta_T$ of the configuration 400-*a* may be used to tilt the first positioning axis 341-*b* towards an east direction, or the tilt angle $\theta_T$ of the configuration 400-*b* may be used to tilt the first positioning axis 341-*b* towards a west direction. Thus, using either configuration in the context of the example 200, the tilted first positioning axis 341-*b* may not coincide with the path 205-*a*, and the tilting of the antenna positioner 340-*b* may therefore support more benign operation of the antenna positioner 340-*b*.

An eccentric tilt position mechanism such as the eccentric tilt position mechanism 301-*b* described with reference to FIGS. 4A and 4B may be configured according to various design characteristics that may be beneficial to operation of the antenna system 105-*c*. For example, it may be advantageous to track a target device 150 when the eccentric element 325-*b* is held at a vertically upper position (e.g., as illustrated in configuration 400-*a* of FIG. 4A) or at a vertically lower position (e.g., as illustrated in the configuration 400-*b* of FIG. 4B), for at least the reasons described with reference to the antenna system 105-*b* of FIGS. 3A and 3B.

Further, in the context of antenna system 105-*c* that includes contact points 405 or 410, an eccentric geometry such as the geometry illustrated in the antenna system 105-*c* may be associated with relatively low angular velocity of the intermediate structure 310-*a* when reaching a point of physical contact (e.g., at the positions where the eccentric element 325-*b* is near a vertical alignment with the axis 321-*b*). Thus, the illustrated geometry may facilitate the intermediate structure 310-*b* easing in to contact points 405 of the base structure 305-*b* with a relatively lower angular velocity of the intermediate structure 310-*b*.

Moreover, in the context of antenna system 105-*c* that includes a compliant element 420-*a*, such a geometry may also provide a favorable mechanical advantage for a drive element configured to drive the rotating element 320-*b* to store a preload in the compliant element 420-*a*. In other words, when the eccentric element 325-*b* is vertically aligned with the axis 321-*b*, compressing or elongating the compliant element 420-*a* may present relatively little resistance to a driven rotation of the rotating element 320-*a*. Thus, for these and other reasons, the antenna positioning apparatus 115-*c* may be configured to choose (e.g., in a control algorithm) to operate the eccentric tilt position mechanism 301-*b* at either the configuration 400-*a* or the configuration 400-*b* (e.g., a discrete set of tilt angles, a discrete set of angles of the rotating element 320-*b*), where in each configuration the eccentric element 325-*b* and the axis 321-*b* may be vertically aligned, or may be nearly vertically aligned.

Figure 5:
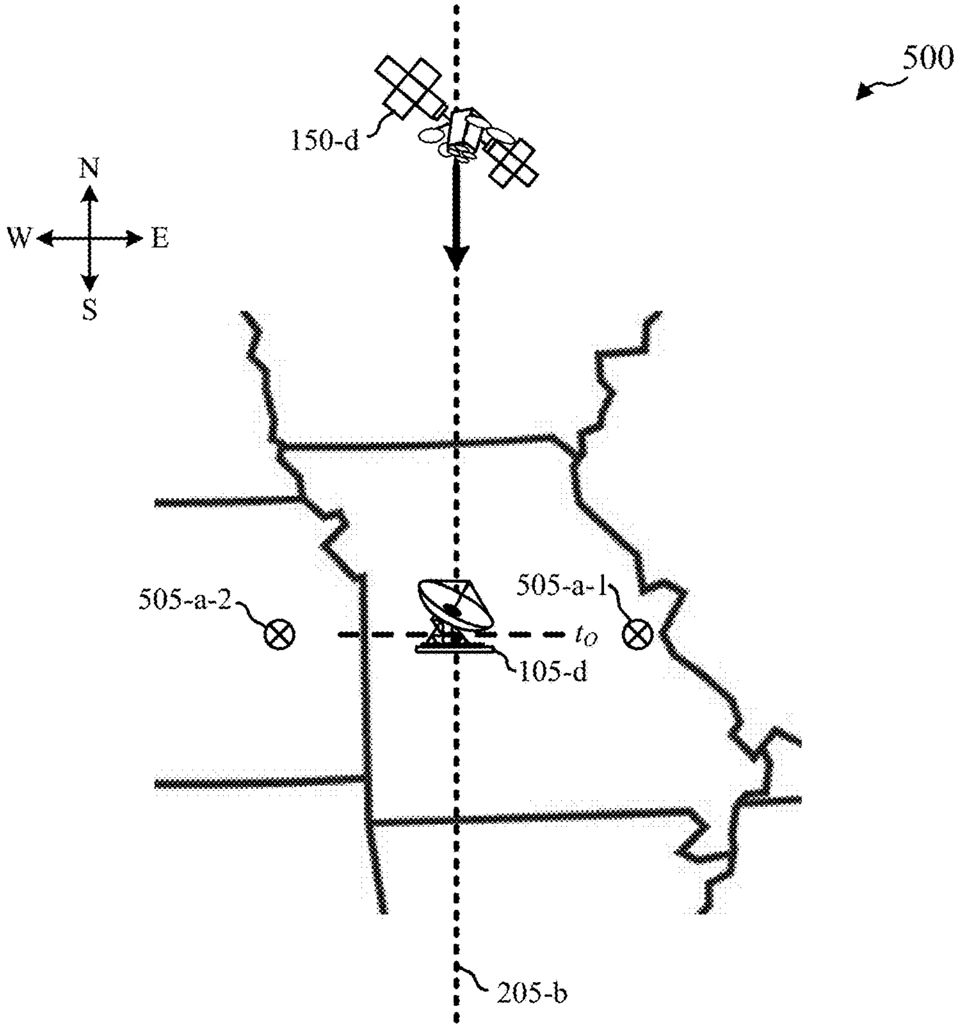
FIG. 5 illustrates an example of a target device a passing over an antenna system along a path in accordance with various aspects of the present disclosure.
Figure 5:
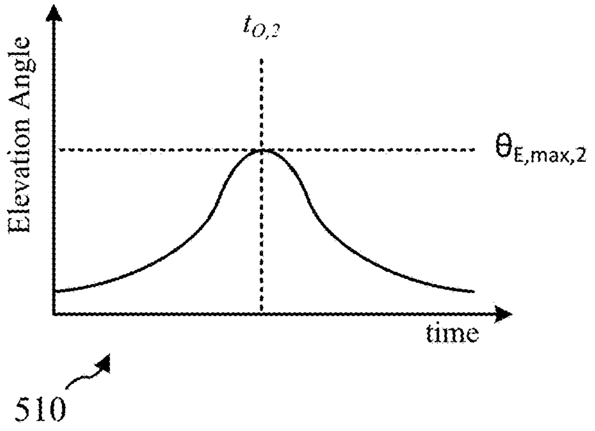
Figure 5:
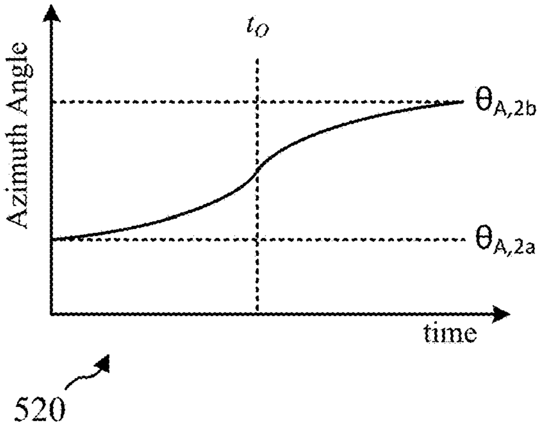

FIG. 5 illustrates an example 500 of a target device 150-*d* passing over an antenna system 105-*d* along a path 205-*b* in accordance with various aspects of the present disclosure. In the example 500, the target device 150-*d* may be a MEO or LEO satellite, and the antenna system 105-*d* may be a ground-based installation such as a component of a gateway system. The path 205-*b* associated with the target device 150-*d* may be an example of a predicted path, which may be predicted by or otherwise known to the antenna system 105-*d* prior to the target device 150-*d* passing the antenna system 105-*d*, prior to the target device 150-*d* entering a field of view of the antenna system 105-*d*, or prior to the antenna system 105-*d* actively tracking the target device 150-*d*. In the example 500, the path 205-*b* follows a generally or predominantly north-to-south orientation (e.g., along a polar orbit), and the target device 150-*a* may be directly overhead from the antenna system 105-*d* at to.

To track the target device 150-*d* along the path 205-*b*, an antenna positioning apparatus 115 of the antenna system 105-*d* may be configured to point an antenna boresight 111 (not shown) of the antenna system 105-*d* along different elevation angles and azimuth angles over time. However, unlike the example 200 described with reference to FIG. 2, the antenna positioning apparatus 115 of the antenna system 105-*d* in the example 500 may be configured to select a tilt angle (e.g., by actuating an eccentric tilt position mechanism 301) such that a positioning axis (e.g., a first positioning axis 341, an azimuth axis) is not pointed directly overhead. In other words, based at least in part on the path 205-*d*, the antenna system 105-*d* may orient a positioning axis (e.g., an azimuth axis) such that the positioning axis does not coincide with the path 205-*d*. For example, to support orbital paths 205 of target devices 150 in predominantly north-to-south directions, the antenna system 105-*d* may include an axis 306 that is also oriented along a north-to-south alignment. However, in various other examples, an axis 306 of an antenna system 105 may be oriented in other directions, which may be chosen to be aligned along a predominant direction of paths 205.

According to a north-to-south alignment of an axis 306 of the antenna system 105-*d*, points 505-*a*-1 and 505-2 may illustrate locations where a positioning axis of a particular tilt configuration may intersect with an elevation corresponding to the path 205-*b*. For example, a positioning axis of the antenna system 105-*d* may emanate from a location of the antenna system 105-*d*, and for a given configuration, point 505-*a*-1 or point 505-*a*-2 may illustrate an intersection of the positioning axis with a horizontal reference plane that is coincident with the target device 150-*d* at time to, or point 505-*a*-1 or point 505-*a*-2 may illustrate an intersection of the positioning axis with a spherical reference surface having a same elevation as the target device 150-*d* at time to.

Referring to the example of the antenna system 105-*c* described with reference to FIGS. 4A and 4B, point 505-*a*-1 may correspond to an intersection of the first positioning axis 341-*b* according to the configuration 400-*a* of FIG. 4A (e.g., according to a negative tilt angle $-\theta_T$), where an upper portion of the intermediate structure 310-*b*, and accordingly the positioning axis 341-*b*, is tilted towards an eastern direction. Further referring to the example of the antenna system 105-*c* described with reference to FIGS. 4A and 4B, point 505-*a*-2 may correspond to an intersection of the first positioning axis 341-*b* according to the configuration 400-*b* of FIG. 4B (e.g., according to a positive tilt angle $\theta_T$), where an upper portion of the intermediate structure 310-*b*, and accordingly the positioning axis 341-*b*, is tilted towards a western direction. Thus, referring to the example of antenna system 105-*c*, configuration 400-*a* or configuration 400-*b* may be selected by the antenna system 105-*c* based at least in part on the path 205-*b*, which may support avoiding adverse performance characteristics associated with the first positioning axis 341-*b* being coincident with the path 205-*b*.

In the case of example 500, the elevation angles of the antenna boresight 111 for tracking the target device 150-*d* over time may be illustrated by the elevation plot 510, and the azimuth angles of the antenna boresight 111 for tracking the target device 150-*d* over time may be illustrated by the azimuth plot 520. The elevation plot 510 and the azimuth plot 520 illustrate angles with reference to a time, to, corresponding to a time when the target device 150-*d* passes directly overhead.

Compared to the elevation plot 210 and the azimuth plot 220 described with reference to example 200, the selection of a tilted positioning configuration (e.g., configuration 400-*a* or configuration 400-*b*) illustrated by the example 500 may be associated with relaxed performance requirements of the associated antenna positioner 340. For example, the maximum elevation angle $\theta_{E,max,2}$ of the example 500 may be lower than the maximum elevation angle $\theta_{E,max,1}$ of the example 200 (e.g., $\theta_{E,max,2}$ may be less than 90 degrees, may be equal to 90 degrees minus $\theta_T$). Regarding azimuth positioning of the example 500, to support the tracking along the path 205-*d*, the time to may not be associated with an instantaneous transition from an initial azimuth angle, $\theta_{A,2a}$, to a final azimuth angle, $\theta_{A,1b}$, and may instead be associated with a relatively smoothed transition in azimuth angle (e.g., with a finite peak azimuth rate at time to). Moreover, the range of azimuth angles $\theta_{A,2a}$ to $\theta_{A,2b}$ of the example 500 may be smaller than the range of azimuth angles $\theta_{A,1a}$ of the example 200 (e.g., the range of azimuth angles $\theta_{A,2a}$ to $\theta_{A,2b}$ may be less than 180 degrees). In further contrast to the example 200, the time to of the example 500 may not be associated with an infinite pointing acceleration about either the azimuth axis or the elevation axis of the antenna system 105-*d* (e.g., not requiring an instantaneous transition from a positive elevation rate to a negative elevation rate at to, not requiring an instantaneous transition from one azimuth position to another at to).

Thus, in accordance with various examples of the present disclosure, the antenna system 105-*d* (e.g., the antenna positioning apparatus 115) of example 500 that includes an eccentric tilt position mechanism 301 may avoid adverse conditions illustrated by the elevation plot 210 and the azimuth plot 220 when the target device 150-*d* follows the path 205-*d*, which may improve the ability of the antenna system 105-*d* to maintain a communication link 130 with the target device 150-*d*.

An antenna system 105 (e.g., a controller associated with the antenna system 105, a controller of a gateway system that communicates with the antenna system 105) may perform various operations, calculations, or determinations to support selecting a particular tilt configuration (e.g., configuration 400-*a* or configuration 400-*b* in the context of the antenna system 105-*c*) for the antenna system 105 based on conditions associated with a predicted path. In some examples, such a selection may be based at least in part on which side of an axis 306 a predicted path 205 will pass. A configuration associated with the point 505-*a*-1 may be selected, for example, whenever a path 205 is west of the antenna system 105-*d*, and, in some examples, a configuration associated with the point 505-*a*-1 may be associated with azimuth tracking in a range of angles from 180 degrees to 360 degrees. A configuration associated with the point 505-*a*-2 may be selected, for example, whenever a path 205 is east of the antenna system 105-*d*, and, in some examples, a configuration associated with the point 505-*a*-1 may be associated with azimuth tracking in a range of angles from κ degrees to 180 degrees. Although a configuration associated with either of point 505-*a*-1 or 505-*a*-2 may be used for a directly overhead path 205, in various examples one configuration or another may be assigned to a directly overhead pass, or a controller may determine to maintain a particular configuration (e.g., refrain from changing configuration, maintain an angular rotation of an intermediate structure 310 with respect to a base structure 305) upon detecting a directly overhead pass.

Additionally or alternatively, a selection between tilt configurations may be based at least in part on one or more of a maximum elevation angle $\theta_E$, a rate of change of azimuth angle $\theta_A$, an angular acceleration about one or both of the first positioning axis 341 or the second positioning axis 342, a separation between the first positioning axis 341 and a direction along a predicted path, or some other characteristic associated with tracking along a path 205 at one or more tilt configurations, which may include comparisons between a current tilt configuration and a new tilt configuration. For example, a controller associated with an antenna system 105 may perform such calculations at each of a set of tilt configurations of the antenna system 105, and unless a particular calculation at a current tilt configuration exceeds a threshold (e.g., being within a threshold separation between a first positioning axis 341 and a path 205, being outside a threshold elevation angle or operating range of an elevation positioner), the antenna system 105 may be commanded to maintain a tilt angle.

In an example of a selection based on a capability of an antenna positioner 340, a selection between tilt configurations may be based at least in part on an elevation capability of an antenna positioner 340 (e.g., an angular range about a positioning axis 342). For example, when an antenna positioner 340 is associated with a 0-90 degree range of elevation control relative to an intermediate structure 310, a ground-based antenna system 105 may not be able to track a target device 150 that is near a western horizon when operating at a tilt configuration associated with the point 505-*a*-1 (e.g., because the target device 150 may be below a minimum elevation angle supported by the associated antenna positioner 340). Thus, under some circumstances, when a path 205 is particularly far to the west of the antenna system 105-*d*, the tilt configuration associated with the point 505-*a*-2 may be selected, despite the path 205 being west of the antenna system 105-*d*. In other words, in some examples, one tilt configuration or another may be selected based at least in part on where a path 205 would be located amongst one or more angular ranges about an axis 306, which may be based at least in part on, or otherwise consider or compensate for an angular range (e.g., a positioner capability) about a positioning axis 342.

Additionally or alternatively, an antenna positioner 340 may be designed or configured to compensate for aspects of an eccentric tilt position mechanism 301. For example, a ground-based antenna system 105 associated with tilt configurations at +/−7 degrees of tilt (e.g., about an axis 306) may be configured with an elevation positioner (e.g., of an antenna positioner 340) having a range, relative to an intermediate structure 310-*a*, between −7 degrees or less and 83 degrees or more (e.g., about a positioning axis 342), which may support extended tracking ranges of the antenna positioner 340 at each of a set of tilt configurations.

Figure 6A:
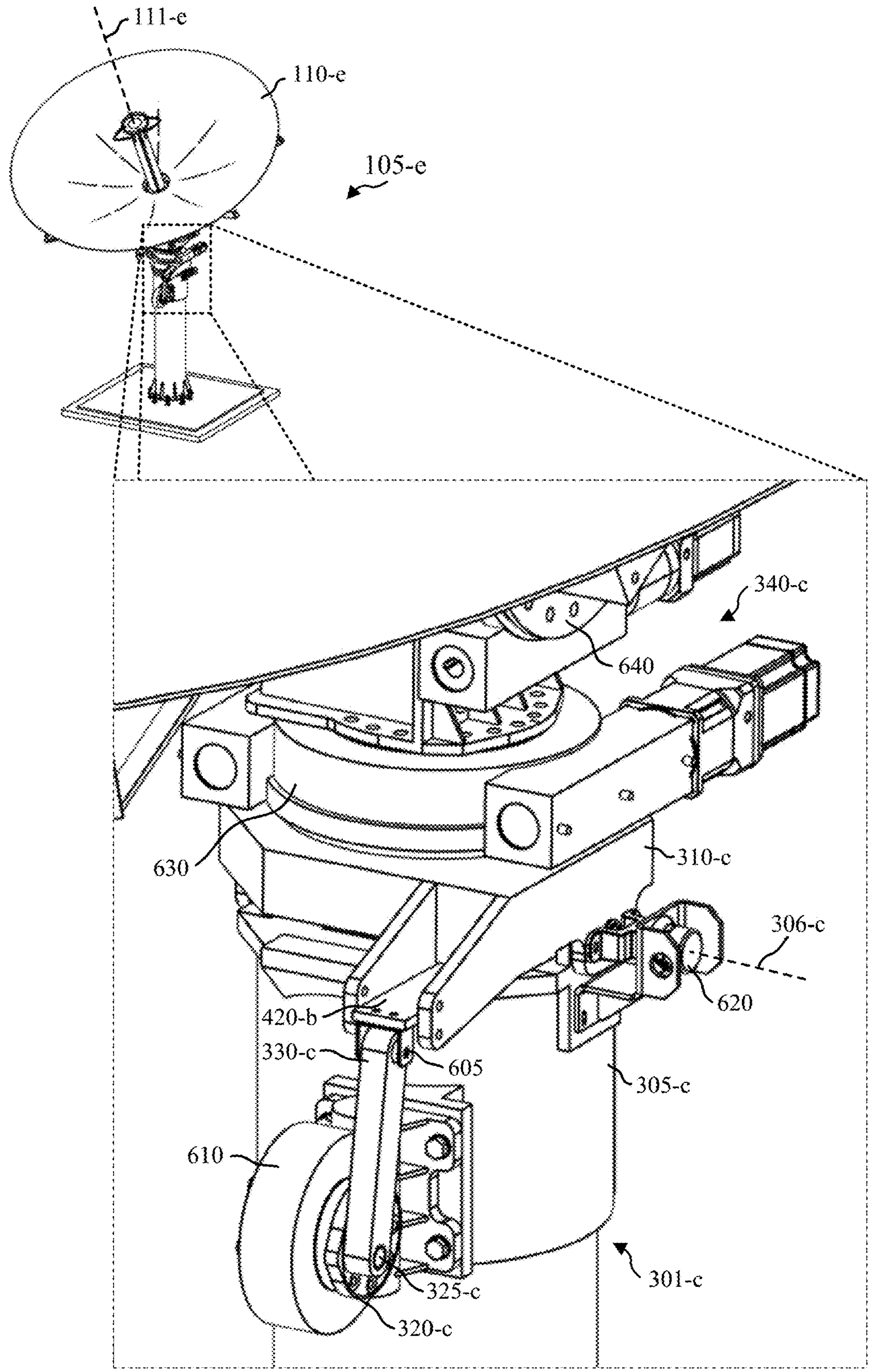
FIGS. 6A and 6B show views of an antenna system employing a tilt position mechanism in accordance with various aspects of the present disclosure.
Figure 6B:
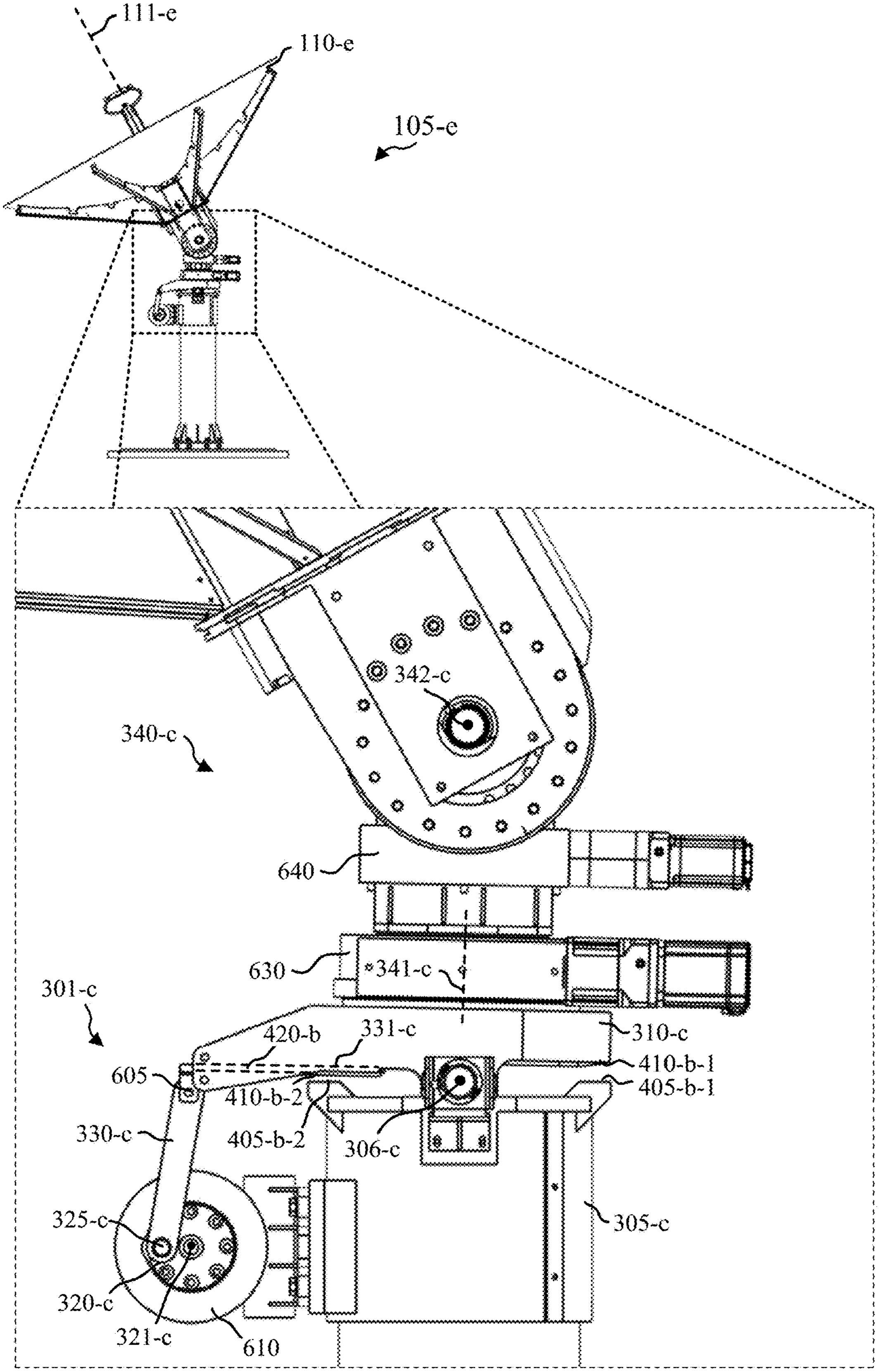

FIGS. 6A and 6B illustrate an example of an antenna system 105-*e* in accordance with various aspects of the present disclosure. The antenna system 105-*e* includes an antenna 110-*e* having an antenna boresight 111-*e*, and an antenna positioning apparatus 115-*e* configured to orient the antenna boresight 111-*e* (e.g., towards a target device 150).

In the example of antenna system 105-*e*, the antenna positioning apparatus 115-*e* includes an antenna positioner 340-*c* (e.g., a positioning system, a tracking system) configured to orient the antenna boresight 111-*e* about two rotational degrees of freedom (e.g., about a first positioning axis 341-*c* and a second positioning axis 342-*c*). In some examples, the first positioning axis 341-*c* may be described as an azimuth positioning axis and the second positioning axis 342-*c* may be described as an elevation positioning axis, though other nomenclature and configurations are possible in accordance with the described techniques. In some examples, the antenna positioner 340-*c* may include an elevation positioner 640 and an azimuth positioner 630 between the elevation positioner 640 and an intermediate structure 310-*c* (e.g., in an elevation-over-azimuth configuration). In some examples, the antenna positioner 340-*c* may be further configured to rotate the antenna 110-*e* (e.g., radiating or receiving elements of the antenna 110-*e*) about an axis parallel with the antenna boresight 111-*e* (e.g., a third rotational degree of freedom) to align the antenna according to vertical, horizontal, or other signal polarization.

In the example of antenna system 105-*e*, the antenna positioning apparatus 115-*e* also includes an illustrative example of an eccentric tilt position mechanism 301-*c* (e.g., an actuator, a tilt actuator). For example, the antenna system 105-*e* (e.g., the antenna positioning apparatus 115-*e*) includes a base structure 305-*c* and an intermediate structure 310-*c*, where the intermediate structure 310-*c* is rotatably coupled with the base structure 305-*c* about an axis 306-*c*. The rotatable coupling provides a degree of rotational freedom between the base structure 305-*c* and the intermediate structure 310-*c*. In various examples, the axis 306-*c* may be horizontal, or non-horizontal.

The eccentric tilt position mechanism 301-*c* also includes a rotating element 320-*c* that is rotatably coupled with the base structure about an axis 321-*c*. In various examples, the axis 321-*c* may be horizontal, or non-horizontal, and the axis 321-*c* may be parallel to the axis 306-*c*, or non-parallel to the axis 306-*c*. The rotating element 320-*c* includes an eccentric element 325-*c* at a distance offset from the axis 321-*c*, which in the example of antenna system 105-*e* is a coupling attached to a first end of a linkage 330-*c*. A second end of the linkage 330-*c* may be attached to a compliant element 420-*b*, which, in the example of eccentric tilt position mechanism 301-*c*, may be a beam spring that is fixedly coupled with the intermediate structure 310-*c* at a coupling location 331-*c* that is offset from the axis 306-*c*. In other words, the linkage 330-*c* illustrates an example for supporting the eccentric element 325-*c* being coupled (e.g., indirectly, via the linkage 330-*b* and the compliant element 420-*b*) with the intermediate structure 310-*c* at a location offset from the axis 306-*c*.

In the example of antenna system 105-*e*, the drive element 610 is illustrated as a slewing drive, which may include a worm gear, driven by a motor, that rotates a gear perpendicular to the axis of the worm gear (e.g., that is coupled with the rotating element 320-*c*). A slewing drive is one example of a gearbox or gearmotor that may be used to support controlled rotation of the rotating element 320-*c*. A slewing drive may have particular advantages in the described eccentric tilt position mechanisms 301. For example, a slewing drive in the described systems may support gearing ratios of 60:1 to 80:1, which may suitably resist back-driving. Accordingly, a slewing drive may support a lower cost gear motor and drive weight. Further, with a relatively small range of travel and near-zero backlash, the resulting higher ratio may support single drive operation for lower cost (e.g., compared to other techniques that may require multiple motors to compensate for backlash). Further, a slewing drive and gear motor may be relatively compact, and may not interfere with full azimuth motion (e.g., 360 degrees in azimuth) and full elevation motion (e.g., 90 degrees in elevation). Although other actuators may be used to provide tilt motion drive force, such other actuators may not be as compact for the same size force generation.

In the example of antenna system 105-*e*, the eccentric tilt position mechanism 301-*c* includes an encoder 620, which may provide a signal indicating the current tilt position (e.g., about the axis 306-*c*), which may be provided to a controller for various tilt positioning or boresight tracking operations described herein. The encoder 620 may be any suitable encoder for determining a relative angular orientation between the intermediate structure 310-*c* and the base structure 305-*c*, which may measure an angular orientation directly, or may make another suitable measurement from which an angular orientation can be determined. In various examples, the encoder 620 may be any of a magnetic encoder, an optical encoder, a conductive encoder, a resolver, a synchro, and the like. Although an eccentric tilt position mechanism 301 may include an encoder 620 to indicate tilt position (e.g., about the axis 306-*c*), an eccentric tilt position mechanism 301 may additionally or alternatively include an encoder that provides an indication of an angular position of a rotating element 320 (e.g., about an axis 321), which may be provided to a controller for various tilt positioning or boresight tracking operations described herein.

In the example of antenna system 105-*e*, relative rotation or angle between the base structure 305-*c* and the intermediate structure 310-*c* about the axis 306-*c* may be limited at a first angle or position by a physical contact between a contact point 405-*b*-1 of the base structure 305-*c* and a corresponding contact point 410-*b*-1 of the intermediate structure 310-*c*. Further, the relative rotation or angle between the base structure 305-*c* and the intermediate structure 310-*c* about the axis 306-*b* may be limited at a second angle or position by a physical contact between a contact point 405-*b*-2 of the base structure 305-*c* and a corresponding contact point 410-*b*-2 of the intermediate structure 310-*c*. In some examples, the intermediate structure 310-*c* may be preloaded into one of the contact point 405-*b*-1 or the contact point 405-*b*-2 by active means (e.g., using the drive element 610), passive means, or a combination thereof, which may reduce or eliminate pointing errors associated with backlash (e.g., of the eccentric tilt position mechanism 301-*c*). In some examples, providing contact points 405-*b* or 410-*b* may improve repeatability of tilt positioning, and therefore improve accuracy of tracking of the antenna boresight 111-*e*, by supporting the rotation of the intermediate structure 310-*c* relative to the base structure 305-*c* to repeatable positions.

In the example of eccentric tilt position mechanism 301-*c*, the compliant element 420-*b* may be configured to store a bending preload based at least in part on an angular displacement of the rotating element 320-*c* about the axis 321-*c*. For example, when rotating the rotating element 320-*c* in a clockwise direction in the view of FIG. 6B (e.g., by driving the drive element 610), the linkage 330-*c* may push the coupling location 605 upward, which may correspondingly push the coupling location 331-*b* upward, thereby rotating the intermediate structure 310-*c* about the axis 306-*c* until the intermediate structure 310-*c* (e.g., the contact point 410-*b*-1) contacts the contact point 405-*b*-1 of the base structure 305-*c*. The intermediate structure 310-*c* may reach the contact point 405-*b*-1 before the eccentric element 325-*b* is vertically aligned with (e.g., directly above) the axis 321-*c*, and further rotation of the rotating element 320-*c* to such an alignment may cause the compliant element 420-*b* to bend (e.g., due to an upward motion of the coupling location 605 while the coupling location 331-*c* maintains a position corresponding to the contact between contact point 410-*b*-1 and contact point 405-*b*-1). Thus, in a configuration where contact point 405-*b*-1 and contact point 410-*a*-1 are driven into physical contact, the compliant element 420-*b* may store a first bending preload in response to the driven contact (e.g., corresponding to a configuration where the eccentric element 325-*c* is vertically aligned above the axis 321-*c*).

In another example, when rotating the rotating element 320-*c* in a counterclockwise direction in the view of FIG. 6B (e.g., by driving the drive element 610), the linkage 330-*c* may pull the coupling location 605 downward, which may correspondingly pull the coupling location 331-*b* downward, thereby rotating the intermediate structure 310-*c* about the axis 306-*c* until the intermediate structure 310-*c* (e.g., the contact point 410-*b*-2) contacts the contact point 405-*b*-2 of the base structure 305-*c*. The intermediate structure 310-*c* may reach the contact point 405-*b*-2 before the eccentric element 325-*c* is vertically aligned with (e.g., directly below) the axis 321-*c*, and further rotation of the rotating element 320-*c* to such an alignment may cause the compliant element 420-*b* to bend (e.g., due to a downward motion of the coupling location 605 while the coupling location 331-*c* maintains a position corresponding to the contact between contact point 410-*b*-2 and contact point 405-*b*-2). Thus, in a configuration where contact point 405-*b*-2 and contact point 410-*a*-2 are driven into physical contact, the compliant element 420-*b* may store a second bending preload in response to the driven contact (e.g., corresponding to a configuration where the eccentric element 325-*c* is vertically aligned below the axis 321-*c*), where the second bending preload may be considered a negative or opposite bending in comparison to the first bending preload.

In various examples, storing a preload in the compliant element 420-*b* may reduce the effect of backlash in various components of the antenna positioning apparatus 115-*e*. For example, loose physical contact (e.g., "play") between components may exist at any one or more of the axis 306-*c* (e.g., a direct coupling between the base structure 305-*c* and the intermediate structure 310-*c*), the axis 321-*c* (e.g., a direct coupling between the rotating element 320-*c* and the base structure 305-*c*), the eccentric element 325-*c* (e.g., a direct coupling between the eccentric element 325-*c* and the rotating element 320-*c*, a direct coupling between the eccentric element 325-*c* and the linkage 330-*c*), the coupling location 605 (e.g., a direct coupling between the linkage 330-*c* and the compliant element 420-*b*), or the coupling location 331-*c* (e.g., a direct coupling between the compliant element 420-*b* and the intermediate structure 310-*c*).

By storing a preload in the compliant element 420-*b*, physical contact between components may be biased or loaded to a particular position so that such components are not free to move, or at least are able to resist some load, force, or other toggling movement. For example, such a preload may prevent toggling between components of the eccentric tilt position mechanism 301-*c* in response to operational winds that are incident on the antenna system 105-*e*. Thus, by storing a preload in the compliant element 420-*b*, relative motion between the intermediate structure 310-*c* and the base structure 305-*c* may be reduced or eliminated (e.g., at an operating point where such preload is stored), which may improve pointing accuracy of the antenna boresight 111-*e* due to the more stable platform (e.g., a more stable position of the intermediate structure 310-*c*) provided for the positioning system 340-*c*. Because such a system is less sensitive to backlash in various components, such an arrangement may permit the use of simplified or lower-cost components, such as lower tolerance bearings, couplings, or bushings at various connection points.

Although the drive element 610 of the antenna system 105-*e* is illustrated as a slewing drive, various other types of drive elements 610 may be used to support the described techniques for tilt positioning, which may be used in combination with a physical stop (e.g., contact points 405, contact points 410). Further, such other types of drive elements 610 may be used in combination with various types of compliant elements 420 for storing a preload, which may mitigate the effects of backlash and improve accuracy for pointing or positioning an antenna boresight 111.

Figure 7:
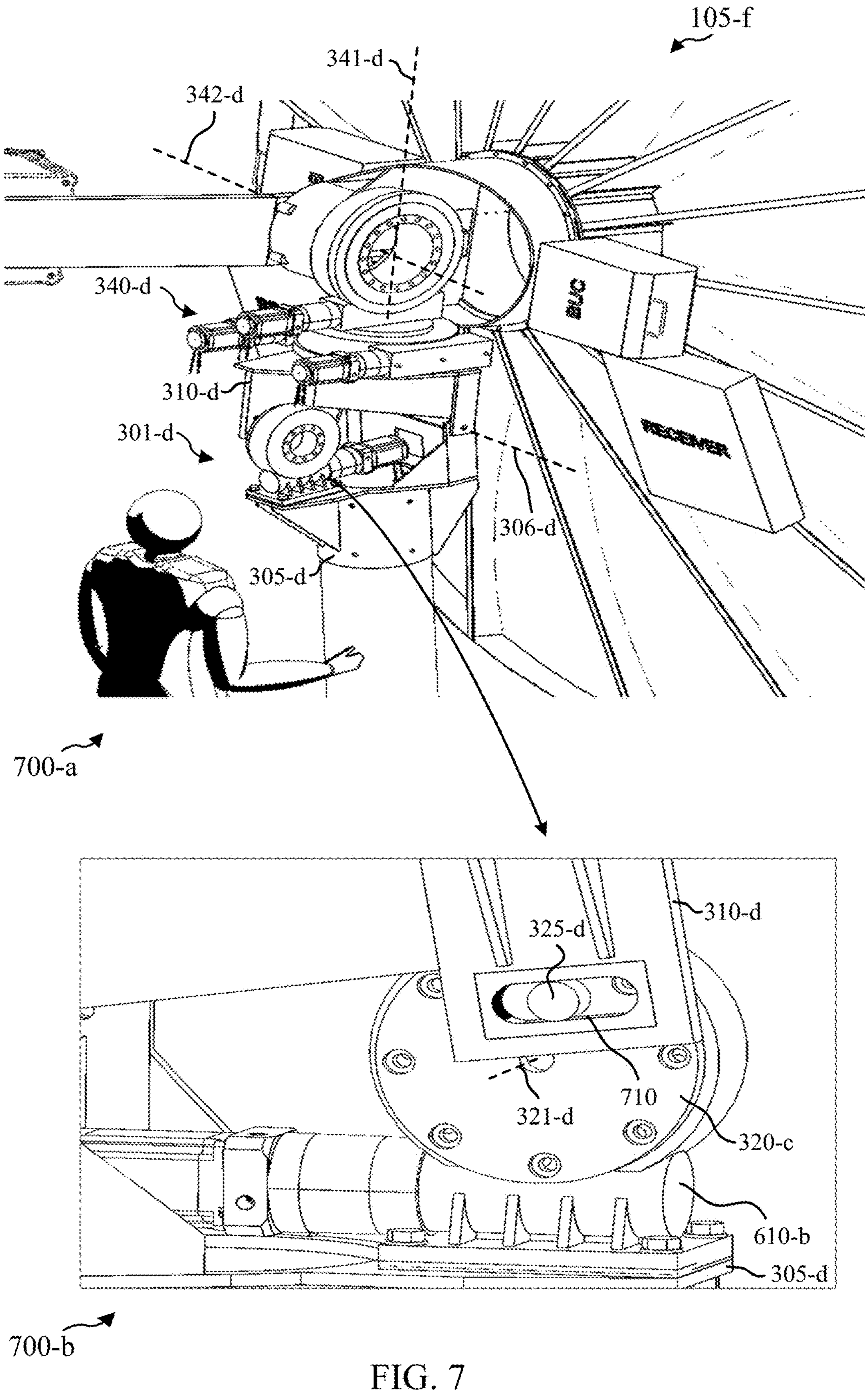
FIG. 7 shows a view of an antenna system employing a tilt position mechanism in accordance with various aspects of the present disclosure.

FIG. 7 shows views of an antenna system 105-*f* employing an antenna positioner 340-*d* and an eccentric tilt position mechanism 301-*d* in accordance with various aspects of the present disclosure. The antenna positioner 340-*d* may provide positioning of an antenna boresight 111 (not shown) about a first positioning axis 341-*d* and a second positioning axis 342-*d* (e.g., relative to an intermediate structure 310-*d*). The eccentric tilt position mechanism 301-*d* may be configured to rotate an intermediate structure 310-*d*, and accordingly the antenna positioner 340-*d*, relative to a base structure 305-*d* about an axis 306-*d*.

The eccentric tilt position mechanism 301-*d* illustrates an example where a relative rotation or angle between a base structure 305-*d* and an intermediate structure 310-*d* may be controlled, set, or maintained by actuating a rotating element 320 (e.g., rotating the rotating element 320-*c* about an axis 321-*d*) with an eccentric element 325-*d* (e.g., a pin) that is engaged in a slot 710 of the intermediate structure 310-*d*. In other words, the eccentric tilt position mechanism 301-*d* illustrates an example for supporting the eccentric element 325-*d* being coupled (e.g., directly, via the slot 710) with the intermediate structure 310-*d* at a location offset from the axis 306-*d*. In some examples, such an actuation may include rotating the rotating element 320-*c* using a using a drive element 610-*b* (e.g., a slewing drive) such that the eccentric element 325-*d* is at a particular position (e.g., such that the eccentric element 325-*d* is vertically aligned with the axis 321-*d*, or nearly vertically aligned). In some examples, such an embodiment may be used to support omitting a linkage 330 from a tilt positioner.

Although contact points 405, contact points 410, or a compliant element 420 are not shown in the antenna system 105-*f*, an eccentric tilt position mechanism 301 that includes an eccentric element 325-*d* (e.g., a pin) engaged in a slot 710 may include one or more of contact points 405, contact points 410, or a compliant element 420 in accordance with the techniques described herein (e.g., as described with reference to the antenna system 105-*c* of FIGS. 4A and 4B).

Figure 8:
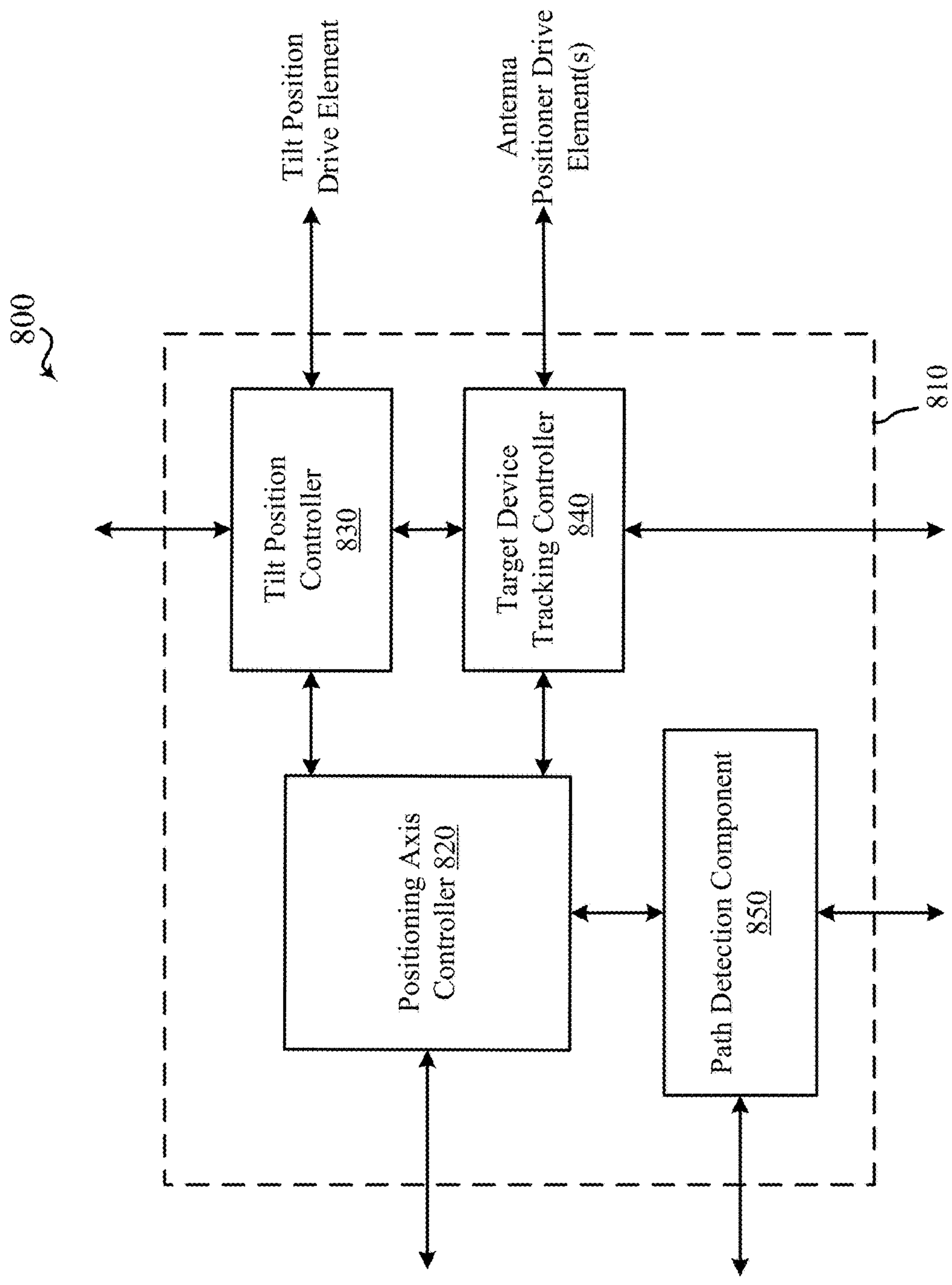
FIG. 8 shows a block diagram illustrating a control system for an antenna positioning system in accordance with various aspects of the present disclosure.

FIG. 8 shows a block diagram 800 illustrating a control system 810 for an antenna positioning apparatus 115 in accordance with various aspects of the present disclosure. The control system 810 may be configured to control one or both of a tilt positioner (e.g., an eccentric tilt position mechanism 301) or an antenna boresight positioner (e.g., an antenna positioner 340) described with reference to FIGS. 1 through 6. For example, the control system 810 may include a tilt position controller 830 for controlling alignment of an intermediate structure 310 or an antenna positioner 340 about a tilt axis (e.g., about an axis 306, based on a predicted or future path or position of a target device 150) and a target device tracking controller 840 for actively tracking a target device 150 by positioning an antenna boresight 111 about two or more rotational degrees of freedom (e.g., about a first positioning axis 341 or a second positioning axis 342, based on a current position of a target device 150). The control system 810 may be configured to set an initial position (e.g., an initial tilt position, an initial boresight alignment) after installation or start-up, to compensate for different predicted or current target paths (e.g., paths 250) or positions of a target device 150, to position an antenna boresight 111 towards a new target device 150 or target path 205, or to respond to any other control command.

The control system 810 can include a positioning axis controller 820 to define or monitor various states of an antenna positioning apparatus 115, or to provide other high-level functions of an antenna positioning apparatus 115. States of an antenna positioning apparatus 115 can include initialization states, operational states, or fault states, and the positioning axis controller 820 can change between states or maintain a particular state in response to pre-programmed commands or signals received from a path detection component 850, a tilt position controller 830, a target device tracking controller 840, or signals from outside the control system 810 such as position detectors, encoders, sensors, relays, user commands, or any other control signal. In some examples, the positioning axis controller 820 may manage operation according to different modes, such as a first mode that corresponds to a repositioning mode, tilting mode, or retraining mode (e.g., when tilting an intermediate structure 310 or antenna positioner 340 from one angular position to another angular position relative to a base structure 305, when not actively tracking a target device 150, when a communication link 130 is not established with a target device 150), or a second mode that corresponds to a tracking mode or a tracking pass (e.g., when tracking a position of a target device 150 to support active communications via a communication link 130). The positioning axis controller 820 may also generate various control signals that are delivered to the tilt position controller 830 or the target device tracking controller 840 in response to pre-programmed instructions or signals received from the path detection component 850, the tilt position controller 830, the target device tracking controller 840, or signals from components outside the control system 810 such as position detectors or encoders, resolvers, synchros, sensors, relays, input devices (e.g., user commands or automated control commands), or other control systems.

The positioning axis controller 820 can receive signals or commands related to a predicted path 205 of a target device 150, a current position of a target device 150, a current tilt position, a current alignment of an antenna boresight, and others to provide commands or signals to the tilt position controller 830 or the target device tracking controller 840. For example, the positioning axis controller 820 may provide commands to the tilt position controller 830 for rotating an intermediate structure 310 or an antenna positioner 340 to a particular angular orientation (e.g., tilt angle) and then hold the angular orientation (e.g., an actuation of a first mode of the positioning axis controller 820, control system 810, or associated antenna system 105). While the intermediate structure 310 or the antenna positioner 340 is held at an angular orientation (e.g., by the tilt position controller 830), the positioning axis controller 820 may provide commands to the target device tracking controller 840 to actuate an antenna positioner 340 to provide a selected antenna positioning (e.g., for actively tracking a target device 150).

In various examples, the control provided by the positioning axis controller 820 (e.g., selection of operational modes, commands or parameters provided to the tilt position controller 830 or target device tracking controller 840) may be based on various conditions, characteristics, or capabilities of an associated antenna system 105. For example, various aspects of control may be based on, or otherwise responsive to an azimuth capability of an antenna positioner

340, an elevation capability of an antenna positioner 340, or a combination thereof. In some examples, various aspects of control may be based on, or otherwise responsive to an angular separation between a positioning axis of an angular degree of freedom of a positioning system (e.g., a first positioning axis 341, a second positioning axis 342) and a predicted path 205 of a target device 150 (e.g., an angle about an axis 306 or a second positioning axis 342 between a direction of a first positioning axis 341 and a predicted path 205 satisfying a threshold or being below a threshold). In some examples, various aspects of control may be based on, or otherwise responsive to a predicted angular rate of a positioning system 340 that is associated with (e.g., required for) tracking a target device 150 along a predicted path 205 of a target device 150 (e.g., an azimuth or elevation rate or acceleration satisfying a threshold or exceeding a threshold). In some examples, various aspects of control may be based on, or otherwise responsive to a predicted angle of an antenna positioner 340 that is associated with (e.g., required for) tracking a target device 150 along a predicted path 205 of a target device 150 (e.g., an elevation angle satisfying a threshold or exceeding a threshold).

The path detection component 850 may be configured to identify or determine a predicted patch of a target device. In some examples, the path detection component 850 may receive information associated with a satellite, such as information corresponding to an orbital path, or a longitude or other direction or location of a path of the satellite relative to an antenna system 105, a tilt axis (e.g., an axis 306), or a positioning axis (e.g., a first positioning axis 341). In some examples, the path detection component 850 may receive or determine position information about a target device 150 over time, and may calculate a predicted path of a target device 150 from such information (e.g., by extrapolation). Such calculations may be useful in scenarios where a described tilt positioner is used to reorient one or more axes of an antenna positioner 340 in response to a moving target device 150 or a moving antenna system 105 that does not have a predetermined path, such as a plane, ground-based vehicle, or other such target device 150 or antenna system 105. The path detection component 850 may pass various information to the positioning axis controller 820, which may make various calculations or determinations (e.g., whether to hold or actuate a tilt positioner) based on such information.

The tilt position controller 830 may be configured for controlling a tilt actuator (e.g., an eccentric tilt position mechanism 301) based at least in part on a predicted path 205 of a target device 150. In some examples, such an actuator may be coupled between a base structure 305 and an intermediate structure 310 that is rotatably coupled with the base structure 305 about an axis 306. In some examples, the controlling may include powering or otherwise actuating a drive element 610 (e.g., a slewing drive, a motor, a drivetrain), and the drive element may rotate a rotating element 320 to set, change, or maintain an angle between the base structure 305 and the intermediate structure 310. In some examples, such an actuation may include or otherwise cause a rotation of the intermediate structure 310 until reaching a physical contact between the intermediate structure 310 and the base structure 305. In some examples, such an actuation may include or otherwise cause a preloading of a compliant element 420 between the actuator (e.g., between the drive element) and one of the base structure 305 or the intermediate structure (310). In some examples, such an actuation may include changing to or holding at a particular angular position that is selected from a discrete set of angular positions (e.g., one of two angular positions, such as tilt angles corresponding to one of configuration 400-*a* or 400-*b* described with reference to FIGS. 4A and 4B)

In some examples, the tilt position controller 830 can generate control signals for a tilt position drive element based on pre-programmed instructions, or other signals received from the positioning axis controller 820 or the target device tracking controller 840, feedback signals from the tilt position drive element, or other instructions or signals received from outside the control system 810, such as an encoder signal or any other signal. The tilt position controller 830 can deliver commands or signals to the tilt position drive element regarding the magnitude and direction for movement for a tilt positioner (e.g., an eccentric tilt position mechanism 301). The tilt position drive element may include power transistors to generate drive current for a motor or other actuator from an electrical power source according to the commands or signals to provide a selected angular position of an intermediate structure 310 relative to a base structure 305.

The target device tracking controller 840 may be configured to track a target device 150 with an antenna boresight 111, which may be a tracking while the tilt position controller 830 maintains (e.g., holds) a relative angle between an intermediate structure 310 and a base structure 305. In some examples, the target device tracking controller 840 may be configured to control a positioning system (e.g., an antenna positioner 340) that is coupled with an intermediate structure 310 that is capable of orienting an antenna boresight 111 about at least two angular degrees of freedom relative to the intermediate structure 310.

The target device tracking controller 840 can generate control signals for a one or more antenna positioner drive elements based on pre-programmed instructions, or other signals received from the positioning axis controller 820 or the tilt position controller 830, feedback signals from one or more antenna positioner drive elements, or other instructions or signals received from outside the control system 810, such as an encoder signal or any other signal. The target device tracking controller 840 can deliver commands or signals to one or more antenna positioner drive elements regarding the magnitude and direction for movement for an antenna boresight 111 (e.g., for positioning an antenna positioner 340). The one or more antenna positioner drive elements may include power transistors to generate drive current for one or more motors or other actuators from an electrical power source according to the commands or signals to provide a selected boresight orientation, such as orientations of an antenna boresight 111 about a first positioning axis 341 or a second positioning axis 342.

In some examples, the positioning axis controller 820, the path detection component 850, the tilt position controller 830, and the target device tracking controller 840 may be separate devices, or separate portions of a unitary control system 810. In other examples, the positioning axis controller 820, the path detection component 850, the tilt position controller 830, and the target device tracking controller 840 may be integrated into the same component or module.

In some examples, the control system 810 may also include an antenna signal feedback information measurement component, which may be configured to measure characteristics of antenna signal at various positions including identifying or estimating signal strength, interference, lost data packets, and the like. In some examples, the measured antenna signal feedback information can be sent to the positioning axis controller 820 or another controller processor that is internal to or external to the control system 810 (e.g., the tilt position controller 830, the target device tracking controller 840). Additionally or alternatively the measured signal feedback information can be used within the antenna signal feedback information measurement component.

The control system 810, including the positioning axis controller 820, the tilt position controller 830, the target device tracking controller 840, and the path detection component 850 may be implemented or performed with a processor, a digital signal processor (DSP), an ASIC, an FPGA, a state machine, or other programmable logic device, discrete gate or transistor logic, discrete hardware components, or any combination thereof designed to perform the functions described herein. A processor may also be implemented as a combination of computing devices, such as a combination of a DSP and a microprocessor, multiple microprocessors, one or more microprocessors in conjunction with a DSP core, or any other such configuration.

Figure 9:
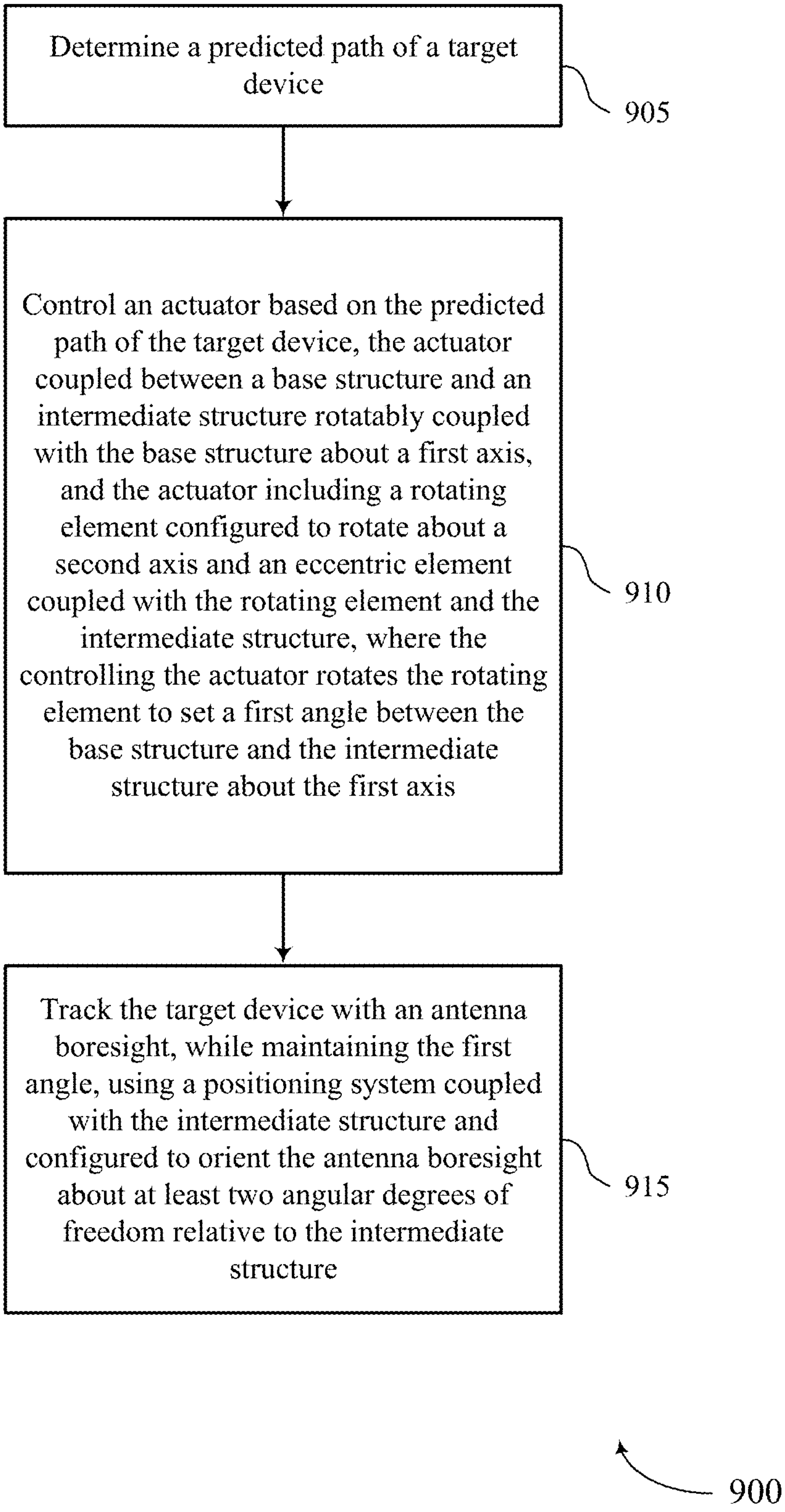
FIG. 9 shows a flowchart illustrating a method that supports antenna positioning with an eccentric tilt pointing mechanism in accordance with aspects of the present disclosure.

FIG. 9 shows a flowchart illustrating a method 900 that supports antenna positioning with an eccentric tilt pointing mechanism in accordance with aspects of the present disclosure. The operations of method 900 may be implemented by a system or its components as described herein. For example, the operations of method 900 may be performed by an antenna positioning apparatus 115 as described with reference to FIGS. 1 through 8. In some examples, a system (e.g., a control system 810) may execute a set of instructions to control the functional elements of the antenna positioning apparatus 115 to perform the described functions. Additionally or alternatively, a system may perform aspects of the described functions using special-purpose hardware.

At 905, the system may determine a predicted path of a target device. The operations of 905 may be performed according to the methods described herein. In some examples, aspects of the operations of 905 may be performed by a path detection component 850 as described with reference to FIG. 8.

At 910, the system may control an actuator based on the predicted path of the target device. The actuator may be coupled between a base structure and an intermediate structure rotatably coupled with the base structure about a first axis. The actuator may include a rotating element configured to rotate about a second axis and an eccentric element coupled with the rotating element and the intermediate structure. In some examples, controlling the actuator rotates the rotating element to set a first angle between the base structure and the intermediate structure about the first axis. The operations of 910 may be performed according to the methods described herein. In some examples, aspects of the operations of 910 may be performed by a tilt position controller 830 as described with reference to FIG. 8.

At 915, the system may track the target device with an antenna boresight, while maintaining the first angle, using a positioning system coupled with the intermediate structure. In some examples, the positioning system may be configured to orient the antenna boresight about at least two angular degrees of freedom relative to the intermediate structure. The operations of 915 may be performed according to the methods described herein. In some examples, aspects of the operations of 915 may be performed by a target device tracking controller 840 as described with reference to FIG. 8.

In some examples, an apparatus as described herein may perform a method or methods, such as the method 900. The apparatus may include features, means, or instructions (e.g., a non-transitory computer-readable medium storing instructions executable by a processor) for determining a predicted path of a target device, controlling an actuator based on the predicted path of the target device to set a first angle between a base structure and an intermediate structure that is rotatably coupled with the base structure about a first axis, and tracking the target device with an antenna boresight, while maintaining the first angle, using a positioning system coupled with the intermediate structure. In some examples, the actuator is coupled between the base structure, and the actuator may include a rotating element configured to rotate about a second axis and an eccentric element coupled with the rotating element and the intermediate structure. In some examples, controlling the actuator rotates the rotating element. In some examples, the positioning system is configured to orient the antenna boresight about at least two angular degrees of freedom relative to the intermediate structure.

Some examples of the method 900 and the apparatus described herein may further include operations, features, means, or instructions for determining a second predicted path of another target device, controlling the actuator based on the second predicted path of the second target device, where the controlling maintains the first angle between the base structure and the intermediate structure about the first axis, and tracking the other target device with the antenna boresight, while continuing to maintain the first angle, using the positioning system. In various examples, the other target device may be the same as the target device, or different from the target device.

In some examples of the method 900 and the apparatus described herein, the controlling may include operations, features, means, or instructions for selecting the first angle from a set consisting of the first angle and a second angle, or some other discrete set of angles.

In some examples of the method 900 and the apparatus described herein, the controlling may be based on azimuth capability of the positioning system, an elevation capability of the positioning system, or a combination thereof.

In some examples of the method 900 and the apparatus described herein, the controlling may be based on an angular separation between an axis of one of the at least two angular degrees of freedom and the predicted path of the target device satisfying a threshold.

In some examples of the method 900 and the apparatus described herein, the controlling may be based on a predicted angular rate of the positioning system that is associated with tracking the target device along the predicted path of the target device satisfying a threshold.

In some examples of the method 900 and the apparatus described herein, the controlling may be based on a predicted elevation angle of the positioning system that is associated with tracking the target device along the predicted path of the target device satisfying a threshold.

In some examples of the method 900 and the apparatus described herein, the controlling may include operations, features, means, or instructions for rotating the rotating element until reaching a physical contact between a contact point of the intermediate structure and a contact point of the base structure.

In some examples of the method 900 and the apparatus described herein, the controlling may include operations, features, means, or instructions for rotating the rotating element after reaching the physical contact between the contact point of the intermediate structure and the contact point of the base structure, where the rotating after reaching the physical contact preloads a compliant element between the actuator and one of the base structure or the intermediate structure.

Figure 10:
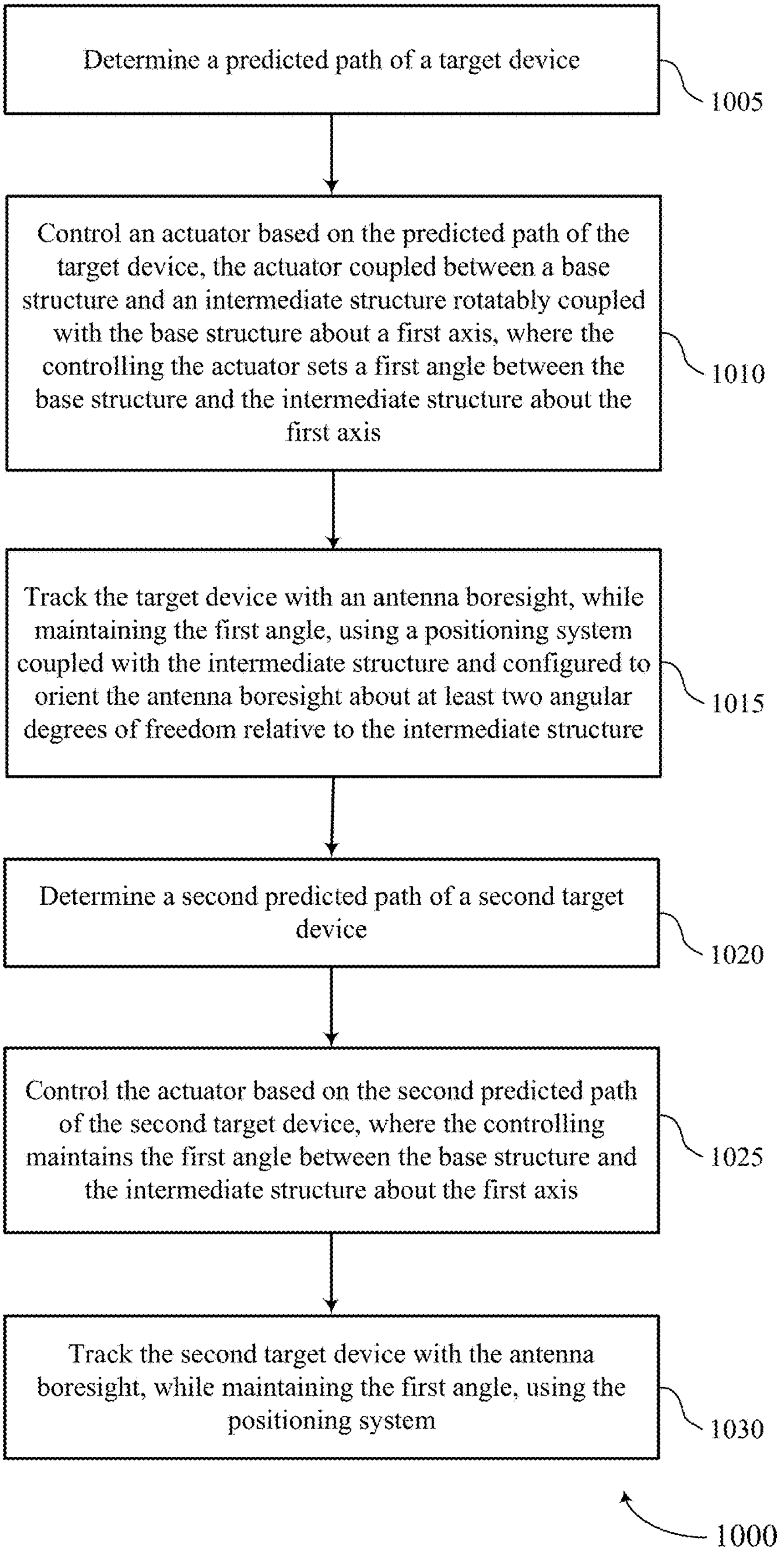
FIG. 10 shows a flowchart illustrating a method that supports antenna positioning with a tilt pointing mechanism in accordance with aspects of the present disclosure.

FIG. 10 shows a flowchart illustrating a method 1000 that supports antenna positioning with a tilt pointing mechanism in accordance with aspects of the present disclosure. The operations of method 1000 may be implemented by a system or its components as described herein. For example, the operations of method 1000 may be performed by an antenna positioning apparatus 115 as described with reference to FIGS. 1 through 8. In some examples, a system (e.g., a control system 810) may execute a set of instructions to control the functional elements of the system to perform the described functions. Additionally or alternatively, a system may perform aspects of the described functions using special-purpose hardware.

At 1005, the system may determine a predicted path of a target device. The operations of 1005 may be performed according to the methods described herein. In some examples, aspects of the operations of 1005 may be performed by a path detection component 850 as described with reference to FIG. 8.

At 1010, the system may control an actuator based on the predicted path of the target device. The actuator may be coupled between a base structure and an intermediate structure that is rotatably coupled with the base structure about a first axis. In some examples, controlling the actuator sets a first angle between the base structure and the intermediate structure about the first axis. In some examples, the controlling may include an actuation until reaching a physical contact between a contact point of the intermediate structure and a contact point of the base structure. In some examples, the controlling may further include an actuation after reaching a physical contact between a contact point of the intermediate structure and a contact point of the base structure, and the actuation may develop or otherwise store a preload of a compliant element between the actuator and one of the base structure or the intermediate structure. The operations of 1010 may be performed according to the methods described herein. In some examples, aspects of the operations of 1010 may be performed by a tilt position controller 830 as described with reference to FIG. 8.

At 1015, the system may track the target device with an antenna boresight, while maintaining the first angle, using a positioning system coupled with the intermediate structure. In some examples, the positioning system may be configured to orient the antenna boresight about at least two angular degrees of freedom relative to the intermediate structure. The operations of 1015 may be performed according to the methods described herein. In some examples, aspects of the operations of 1015 may be performed by a target device tracking controller 840 as described with reference to FIG. 8.

At 1020, the system may determine a second predicted path of a second target device. The operations of 1020 may be performed according to the methods described herein. In some examples, aspects of the operations of 1020 may be performed by a path detection component 850 as described with reference to FIG. 8.

At 1025, the system may control the actuator based on the second predicted path of the second target device, where the controlling maintains the first angle between the base structure and the intermediate structure about the first axis. In some examples, the controlling may maintain a physical contact between a contact point of the intermediate structure and a contact point of the base structure. In some examples, the controlling may further include maintaining a preload of a compliant element between the actuator and one of the base structure or the intermediate structure. The operations of 1025 may be performed according to the methods described herein. In some examples, aspects of the operations of 1025 may be performed by a tilt position controller 830 as described with reference to FIG. 8.

At 1030, the system may track the second target device with the antenna boresight, while maintaining the first angle, using the positioning system. The operations of 1030 may be performed according to the methods described herein. In some examples, aspects of the operations of 1030 may be performed by a target device tracking controller 840 as described with reference to FIG. 8.

It should be noted that the methods described above describe possible implementations, and that the operations and the steps may be rearranged or otherwise modified and that other implementations are possible. Further, aspects from two or more of the methods may be combined.

Thus, the methods 900 and 1000 may provide for antenna positioning in systems employing a multiple-assembly antenna positioner. It should be noted that the methods 900 and 1000 discuss exemplary implementations and that the operations of the methods 900 or 1000 may be rearranged or otherwise modified such that other implementations are possible. For example, aspects from two or more of the methods 900 or 1000 may be combined.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The foregoing description and claims may refer to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled with another element/feature.

As used herein, unless expressly stated otherwise, "rotatably coupled" refers to a coupling between objects which have a positional constraint between them at a coupling location, and have at least one rotational degree of freedom between them, where the at least one rotational degree of freedom is about at least one axis that passes through the coupling location. For instance, objects may be rotatably coupled by any of a ball bearing, a roller bearing, a journal bearing, a bushing, a spherical bearing, a ball and socket joint, and the like. A description of objects being "rotatably coupled" does not preclude a linear degree of freedom between the objects. For instance, rotatably coupled objects may be coupled by a cylindrical journal bearing that provides a rotational degree of freedom about the axis of the cylinder, as well as a linear degree of freedom along the axis of the cylinder. In such an example, the positional constraint between the objects would be in a radial direction from the axis of the cylinder.

As used herein, unless expressly stated otherwise, "fixedly coupled" refers a coupling between objects which have neither a linear degree of freedom nor a rotational degree of freedom between them. For instance, objects may be fixedly coupled by any one or more of a screw, a bolt, a clamp, a magnet, or by a process such as welding, brazing, soldering, gluing, fusing, and the like. A description of objects being "fixedly coupled" does not entirely preclude movement between the objects. For instance, objects that are fixedly coupled may have looseness or wear at a location of coupling which permits some degree of movement between objects. Further, objects that are fixedly coupled may experience a degree of movement between them as a result of compliance within or between the objects. In addition, two objects that are fixedly coupled may not be in direct contact, and may instead have other components that are fixedly coupled between the two objects.

Thus, although the various schematics shown in the Figures depict example arrangements of elements and components, additional intervening elements, devices, features, or components may be present in an actual embodiment (assuming that the functionality of the depicted circuits is not adversely affected).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. A system, comprising:

a structure configured to pivot about a pivot axis and comprising a contact point at a location different than the pivot axis;

a positioning system coupled with the structure and configured to track movement, of an object moving along an object path, about at least two angular degrees of freedom relative to the structure that are separate from the pivot axis; and an actuator configured to pivot the structure about the pivot axis, the actuator comprising:

a linkage coupled with the structure at a location offset from the pivot axis; and a drive element configured to move the linkage and cause a change in relative angle between the structure and a base about the pivot axis in response to movement of the linkage, wherein the change in relative angle between the structure and the base is limited at a first angle by a physical contact between the contact point of the structure and the base.

2. The system of claim 1, wherein the linkage is coupled with the structure via a compliant element.

3. The system of claim 2, wherein the compliant element is configured to store a preload based at least in part on a displacement of the drive element while the change in relative angle between the structure and the base is limited at the first angle by the physical contact between the contact point of the structure and the base.

4. The system of claim 1, wherein the change in relative angle between the structure and the base is limited at a second angle by a physical contact between a second contact point of the structure, at a different location than the contact point, and the base.

5. The system of claim 1, further comprising:

a control system configured to control the actuator based at least in part on a predicted path of the object.

6. The system of claim 5, wherein the control system is configured to:

determine whether to actuate the drive element or to hold the drive element based at least in part on a predicted portion of the object path.

7. The system of claim 5, wherein the control system is configured to:

control the drive element to maintain the physical contact between the contact point of the structure and the base; and control the positioning system to track the movement of the object along the object path while maintaining the physical contact between the contact point of the structure and the base.

8. The system of claim 1, further comprising:

a control system configured to control the actuator based at least in part on a predicted position of a target device relative to the system.

9. The system of claim 1, wherein the positioning system comprises:

an elevation positioner; and an azimuth positioner between the elevation positioner and the structure.

10. A system, comprising:

a structure configured to pivot about a pivot axis;

a positioning system coupled with the structure and configured to track movement, of an object moving along an object path, about at least two angular degrees of freedom relative to the structure that are separate from the pivot axis;

an actuator configured to pivot the structure about the pivot axis, the actuator comprising:

a linkage coupled with the structure at a location offset from the pivot axis; and a drive element configured to move the linkage and cause a change in relative angle between the structure and a base about the pivot axis in response to movement of the linkage; and a control system configured to cause the system to:

actuate the drive element, before tracking movement of the object using the positioning system, to establish a first angle between the structure and the base about the pivot axis based at least in part on a predicted path of the object;

control the drive element to maintain the first angle between the structure and the base about the pivot axis; and control the positioning system to track the movement of the object along the object path while maintaining the first angle between the structure and the base about the pivot axis.

11. The system of claim 10, wherein the control system is configured to cause the system to:

actuate the drive element to establish the first angle between the structure and the base about the pivot axis based at least in part on a separation between the predicted path of the object and a positioning axis of the positioning system.

12. The system of claim 10, wherein the change in relative angle between the structure and the base is limited at the first angle by a physical contact between a contact point of the structure and the base.

13. The system of claim 12, wherein the linkage is coupled with the structure via a compliant element that is configured to store a preload based at least in part on a displacement of the drive element while the change in relative angle between the structure and the base is limited at the first angle by the physical contact between the contact point of the structure and the base.

14. The system of claim 12, wherein the change in relative angle between the structure and the base is limited at a second angle by a second physical contact between a second contact point of the structure, at a different location than the contact point, and the base.

15. The system of claim 10, wherein the positioning system comprises: an elevation positioner; and an azimuth positioner between the elevation positioner and the structure.

16. A system, comprising:

a structure configured to pivot about a pivot axis;

a positioning system coupled with the structure and configured to track movement of an object while moving along an object path, the positioning system comprising:

a first positioner associated with positioning about a first positioning axis that is perpendicular to the pivot axis; and a second positioner associated with positioning about a second positioning axis that is perpendicular to the first positioning axis, the first positioner being between the second positioner and the structure; and an actuator configured to pivot the structure about the pivot axis, the actuator comprising:

a linkage coupled with the structure at a location offset from the pivot axis; and a drive element configured to move the linkage and cause a change in relative angle between the structure and a base about the pivot axis in response to movement of the linkage.

17. The system of claim 16, further comprising:

a control system configured to control the actuator based at least in part on a separation between a predicted path of the object and the first positioning axis.

18. The system of claim 17, wherein the control system is configured to:

actuate the drive element based at least in part on the separation between the predicted path of the object and the first positioning axis exceeding a threshold; and hold the drive element based at least in part on the separation between the predicted path of the object and the first positioning axis being below the threshold.

19. The system of claim 16, wherein the change in relative angle between the structure and the base is limited at an angle by a physical contact between a contact point of the structure and the base.

20. The system of claim 12, wherein the linkage is coupled with the structure via a compliant element that is configured to store a preload based at least in part on a displacement of the drive element while the change in relative angle between the structure and the base is limited at the first angle by the physical contact between the contact point of the structure and the base.

* * * * *